US006788847B2

(12) United States Patent
Paddon et al.

(10) Patent No.: US 6,788,847 B2
(45) Date of Patent: Sep. 7, 2004

(54) PHOTONIC INPUT/OUTPUT PORT

(75) Inventors: Paul J. Paddon, Vancouver (CA);
Michael K. Jackson, Richmond (CA);
Jeff F. Young, North Vancouver (CA);
Selena Lam, Vancouver (CA)

(73) Assignee: Luxtera, Inc., Carlsbad, CA (US)

(*) Notice: Subject to any disclaimer, the term of this patent is extended or adjusted under 35 U.S.C. 154(b) by 255 days.

(21) Appl. No.: 10/109,302

(22) Filed: Mar. 28, 2002

(65) Prior Publication Data

US 2002/0164118 A1 Nov. 7, 2002

Related U.S. Application Data

(60) Provisional application No. 60/281,650, filed on Apr. 5, 2001, provisional application No. 60/302,256, filed on Jun. 29, 2001, and provisional application No. 60/332,339, filed on Nov. 21, 2001.

(51) Int. Cl.[7] .............................. G02B 6/26; G02B 6/30; H01L 31/0328
(52) U.S. Cl. .............................. 385/31; 257/184; 385/49
(58) Field of Search ............................. 257/184; 385/31, 385/47, 49, 52, 147

(56) References Cited

U.S. PATENT DOCUMENTS

| 5,101,458 | A | 3/1992 | Spaulding et al. ............ 385/36 |
| 5,101,459 | A | 3/1992 | Sunagawa ..................... 385/37 |
| 5,276,756 | A | 1/1994 | Chambers et al. ............ 385/90 |
| 5,315,676 | A | 5/1994 | Sunagawa ..................... 385/37 |

(List continued on next page.)

FOREIGN PATENT DOCUMENTS

| EP | 0751409 | 1/1997 |
| JP | 63-106605 | 11/1988 |

OTHER PUBLICATIONS

E. Yablonovitch, "Photonic band–gap structures" *Journal of The Optical Society of America*—B, Optical Society of America, Washington, vol. 10, No. 2, Feb. 1, 1993, pp. 283–295.

Labilloy, et al., "Diffraction Efficiency and Guided Light Control by Two–Dimensional Photonic–Bandgap Latices" *IEEE Journal of Quantum Electronics*, IEEE Inc. New York, vol. 35, No. 7, Jul. 1999, pp. 1045–1052.

Peng and Tamir, "Directional blazing of waves guided by asymmetrical dielectric gratings," Opt. Comm. 11, 405–409 (1974).

T. Tamir and A. T. Peng, "Analysis and design of grating couplers," Appl. Phys. 14, pp. 235–254 (1977).

Avrutsky et al., "High–efficiency single–order waveguide grating coupler," Opt. Lett. 24, 1446–1448 (1990).

(List continued on next page.)

*Primary Examiner*—Akm Enayet Ullah
(74) *Attorney, Agent, or Firm*—Fernandez & Associates, LLP

(57) ABSTRACT

The present I/O ports comprise (1) a layered structure comprising (a) an unpatterned superstrate having at least one layer, (b) an unpatterned substrate having at least one layer, and (c) at least one intermediate layer sandwiched between the unpatterned superstrate and the unpatterned substrate, (2) a coupling region that is within the at least one intermediate layer and that comprises an arrangement of at least one optical scattering element and (3) at least one output waveguide. The present I/O ports can be effectively used in balanced photonic circuits and unbalanced photonic circuits.

19 Claims, 16 Drawing Sheets

U.S. PATENT DOCUMENTS

| | | | |
|---|---|---|---|
| 5,327,517 A | 7/1994 | Yamada et al. | 385/137 |
| 5,363,226 A | 11/1994 | Strasser et al. | 359/566 |
| 5,371,822 A | 12/1994 | Horwitz et al. | 385/89 |
| 5,375,182 A | 12/1994 | Chambers et al. | 385/49 |
| 5,375,184 A | 12/1994 | Sullivan | 385/129 |
| 5,412,748 A | 5/1995 | Furuyama et al. | 385/92 |
| 5,436,991 A | 7/1995 | Sunagawa et al. | 385/37 |
| 5,471,552 A | 11/1995 | Wuu et al. | 385/49 |
| 5,479,540 A | 12/1995 | Boudreau et al. | 385/14 |
| 5,600,741 A | 2/1997 | Hauer et al. | 385/35 |
| 5,654,818 A | 8/1997 | Yao | 359/246 |
| 5,657,407 A | 8/1997 | Li et al. | 385/37 |
| 5,684,817 A | 11/1997 | Houdre et al. | 372/45 |
| 5,703,973 A | 12/1997 | Mettler et al. | 385/14 |
| 5,857,049 A | 1/1999 | Beranek et al. | 385/91 |
| 5,898,803 A | 4/1999 | Mueller-Fiedler et al. | 385/36 |
| 5,905,831 A | 5/1999 | Boudreau et al. | 385/88 |
| 5,955,749 A | 9/1999 | Joannopoulos et al. | 257/98 |
| 5,966,486 A | 10/1999 | Boudreau et al. | 385/90 |
| 5,981,975 A | 11/1999 | Imhoff | 257/81 |
| 5,993,074 A | 11/1999 | Chambers et al. | 385/90 |
| 5,999,269 A | 12/1999 | Haugsjaa et al. | 356/401 |
| 6,118,917 A | 9/2000 | Lee et al. | 385/49 |
| 6,157,759 A | 12/2000 | Seo et al. | 385/49 |
| 6,175,671 B1 | 1/2001 | Roberts | 385/14 |
| 6,222,967 B1 | 4/2001 | Amano et al. | 385/49 |
| 6,512,866 B1 * | 1/2003 | Fan et al. | 385/27 |
| 2002/0086454 A1 * | 7/2002 | Evans et al. | 438/31 |
| 2003/0002046 A1 * | 1/2003 | Myers et al. | 356/459 |
| 2003/0133486 A1 * | 7/2003 | Evans et al. | 372/50 |

OTHER PUBLICATIONS

Spaulding and Morris, "Achromatic waveguide input/output coupler design," Appl. Opt. 30, 1096–1112 (1991).

Gupta and Li, "Achromatic compensation for integrated optic grating couplers with focused beams," Appl. Opt. 30, 1461–1463 (1991).

Heatherington et al., "Dispersion compensation for an integrated optic grating coupler utilizing a transmission volume hologram," Appl. Opt., 32, 303–308 (1993).

Bates et al., "Gaussian beams from variable groove depth grating couplers in planar waveguides," Appl. Opt. 32, 2112–2116 (1993).

Roncone et al., "Design and fabrication of a single leakage–channel grating coupler," Appl. Opt. 32, 4522–4528 (1993).

Mendes et al., "70–nm band width achromatic waveguide coupler", Appl. Opt. 34, 6180–6186 (1995).

Touam and Najafi,"Symmetric profile beams from waveguides with asymmetric grating couplers" Appl. Opt. 36, 2554–2558 (1997).

J. Backlund et al., "Incoupling waveguide hologram with reduced polarization sensitivity," IEEE. Phot Tech. Lett. 11, p. 227 (1999).

Cowan et al, "Resonant scattering and mode coupling in 2D textured planar waveguides, " J. Opt. Soc. Amer. A18, (5), pp. 1160–1170, May. 2001.

D. Tailaert et al, "A high–efficiency out–of–plane fibre coupler for coupling to high index contrast waveguides," Proc. of European Conference on Optical Communications (ECOC 2001), Amsterdam, The Netherlands, Oct. 2001, pp. 30–31.

* cited by examiner (a)

(b)

(a)

(b)

PHOTONIC INPUT/OUTPUT PORT

CROSS-REFERENCE TO RELATED APPLICATIONS

This application relates to and claims priority benefits from U.S. Provisional Patent Application Serial No. 60/281,650, filed Apr. 5, 2001, which is incorporated by reference herein in its entirety, from U.S. Provisional Patent Application Serial No. 60/302,256, filed Jun. 29, 2001, which is incorporated by reference herein in its entirety and from U.S. Provisional Patent Application Serial No. 60/332,339, filed Nov. 21, 2001, which is incorporated by reference herein in its entirety.

FIELD OF THE INVENTION

This invention is related to the field of integrated optics (that is, integrated photonics). In particular, the present devices are photonic input/output (I/O) ports designed for effective coupling of optical signals from a planar photonic circuit to an external optical fiber, or vice versa. Moreover, the present I/O ports enable the implementation of balanced photonic circuits for polarization independent operation.

BACKGROUND OF THE INVENTION

Effective optical (that is, photonic) telecommunication systems require high-performance, low-cost photonic devices. Such a requirement has motivated development of integrated photonic circuits that are planar or substantially planar. Those circuits interface with other devices and system components using input/output (I/O) ports, which may be referred to as couplers or grating couplers and which typically optically connect planar or substantially planar circuits to cylindrical optical fibers. Such I/O ports can act as input ports, output ports, or bi-directional ports. As used herein, the terms input port(s), output port(s), bi-directional port(s) and I/O port(s) may be used interchangeably. In other words, unless otherwise specified, each of those terms contemplates and includes all of those terms.

In planar or substantially planar photonic circuits, coupling to or from an optical fiber is commonly achieved in an axial geometry arrangement using a system of lenses (FIG. 1(a)), or by directly attaching the fiber to the planar or substantially planar photonic circuit (FIG. 1(b)). The problems with such approaches include the need for photonic circuit surfaces of high quality (that is, highly smooth, planar or substantially planar surfaces, which may be prepared by cleaving and/or polishing and through which a photonic signal may pass), and the need for highly accurate mechanical alignment of micro-photonic elements. In addition, to be effective, many planar or substantially planar photonic circuits are required to be polarization independent (that is, to operate substantially the same way for any input polarization). Consistently achieving polarization independence in effective axially-coupled planar or substantially planar circuits has proven to be generally difficult and, in some cases, has resulted in I/O ports that compromise a circuit's overall performance or flexibility. Moreover, devices, such as I/O ports, fabricated on the same wafer cannot be properly tested until after separation into individual elements. Such testing constraints have further complicated efforts to commercialize effective telecommunication systems.

The present I/O ports can be effectively incorporated into planar or substantially planar photonic circuits, and the present I/O ports effectively couple light to optical fibers. The present I/O ports can effectively couple light at normal or near-normal incidence to the plane of the photonic circuit. As used herein, the term "near-normal" shall mean and include angles up to approximately 30° away from normal (that is angles ranging from approximately −30° to approximately +30°), and the term "off-normal" shall mean and include all "near-normal" angles except those angles equal to approximately 0°. In near normal geometry, light from an optical fiber is shone either indirectly, using a system of lenses (as shown in FIG. 2(a)), or directly (as shown in FIG. 2(b)) onto the input port located on the top (or bottom) surface of the planar or substantially planar photonic circuit.

In effective optical telecommunication systems, particularly those employing dense wavelength-division multiplexing (DWDM), I/O ports are usually operable over a wide band of input frequencies and, thus, over a wide band of input wavelengths. Current commercially available optical telecommunications systems employ wavelengths from approximately 1525 to approximately 1565 nm, a range known as the C-band, and wavelengths from approximately 1565 to approximately 1620 nm, a range known as the L-band. It is therefore important to control (for example, to maximize), the operational bandwidth of an I/O port. As used herein, the term "control" shall mean and include minimize, maximize, reduce, increase and/or achieve a desired or effective level or range, unless otherwise specified.

It is also important to control (for example, to maximize) coupling efficiency, with coupling efficiency being the fraction of light incident upon the I/O port that is transferred into the coupled circuit. Similarly, controlled insertion loss is desired. Insertion loss, expressed in decibels (dB), is defined as ten times the base ten logarithm of the inverse of the coupling efficiency.

Prior work in connection with or relating to I/O ports featuring the geometry of FIG. 2 has been conducted. Such prior I/O ports have been used in connection with normal and near normal incidence coupling and typically comprise an optical waveguide and one-dimensional or approximately one-dimensional grating, which is a periodic arrangement of grooves or straight lines. The grating grooves or lines serve as optical scattering elements for incident light, and are arranged to direct near-normal incident light into the plane of the device in a coupling region.

Prior work in connection with or relating to I/O ports featuring the geometry of FIG. 2 can be distinguished from the present I/O ports by, for example, considering the index contrast in a coupling region, $\Delta n$. $\Delta n$ is defined as the difference between the maximum refractive index and the minimum refractive index of the respective constituent materials in the coupling region (that is, the respective constituent materials comprising an optical scattering element, which is defined below). Those constituent materials may, as explained below, be air and the material of which the coupling region is made. Prior work on near-normal-incidence couplers has concerned low index contrast gratings in low index contrast waveguides. Such prior work has suffered from limited coupling bandwidth, insertion loss and/or sensitivity to angular misalignment.

It is desirable to achieve effective operation of a planar or substantially planar photonic circuit with the simple direct fiber attachment of FIG. 2(b). For a conventional single-mode optical fiber (that is, an optical fiber that supports only one propagating mode at the operating wavelength), such as the fiber illustrated in FIG. 2(b), the spatial profile of the optical mode can be considered Gaussian. The mode field diameter of the optical mode, which diameter is defined as the full width at the $1/e^2$ intensity points, is typically on the order of 10 $\mu$m. Prior planar or substantially planar photonic circuits suffer from higher insertion loss with such small mode field diameters, and, accordingly, such circuits usually require beam expanding optics in order to adapt the mode field diameter of the fiber to the larger mode field diameter characteristic of prior I/O ports.

Prior I/O ports designed to couple light at near-normal incidence typically suffer from excessive polarization dependence. In other words, certain optical performance specifications for a photonic circuit (such as, for example, the insertion loss for the circuit), depend upon the polarization of the input light. More specifically, prior work shows that prior near-normal incidence I/O ports suffer from polarization-dependent loss (PDL), which is defined as the maximum amount of insertion loss variation observed for the photonic circuit while varying the input light over all possible states of polarization.

A number of suggested solutions to the above problems, which suggested solutions are taught by prior work, involve complex systems of micro-optical elements or complex fabrication sequences. Such suggested solutions are unacceptable for one or more reasons, including, the tendency for such micro-optical elements to move (physically) over time, the cost of assembling those complex systems and the lower yields typically attributable to complex fabrication sequences.

Another important aspect of the design of an effective I/O port is its compatibility with in-plane waveguide interconnects of the planar photonic integrated circuit. It is preferable to use single mode waveguides in planar photonic integrated circuits. In many cases, the typical transverse mode profile of guided light is on the order of 1 $\mu$m. As mentioned above, the typical mode field diameter exiting from a single mode optical fiber is on the order of 10 $\mu$m. Therefore, to achieve meaningful effectiveness in an I/O port, an additional mode-size converting optical element is needed. One such appropriate element is a planar waveguide lens.

BRIEF DESCRIPTION OF THE DRAWINGS

In FIG. 14(a) & (b), optical scattering elements are patterned in an upper silicon layer. Subsequently, an unpatterned $SiO_2$ layer is attached (for example, by wafer bonding).

FIG. 15(a) also shows the use of intermediate waveguides. FIG. 15(b) also shows the use of intermediate waveguides.

SUMMARY OF THE INVENTION

Figure 1:
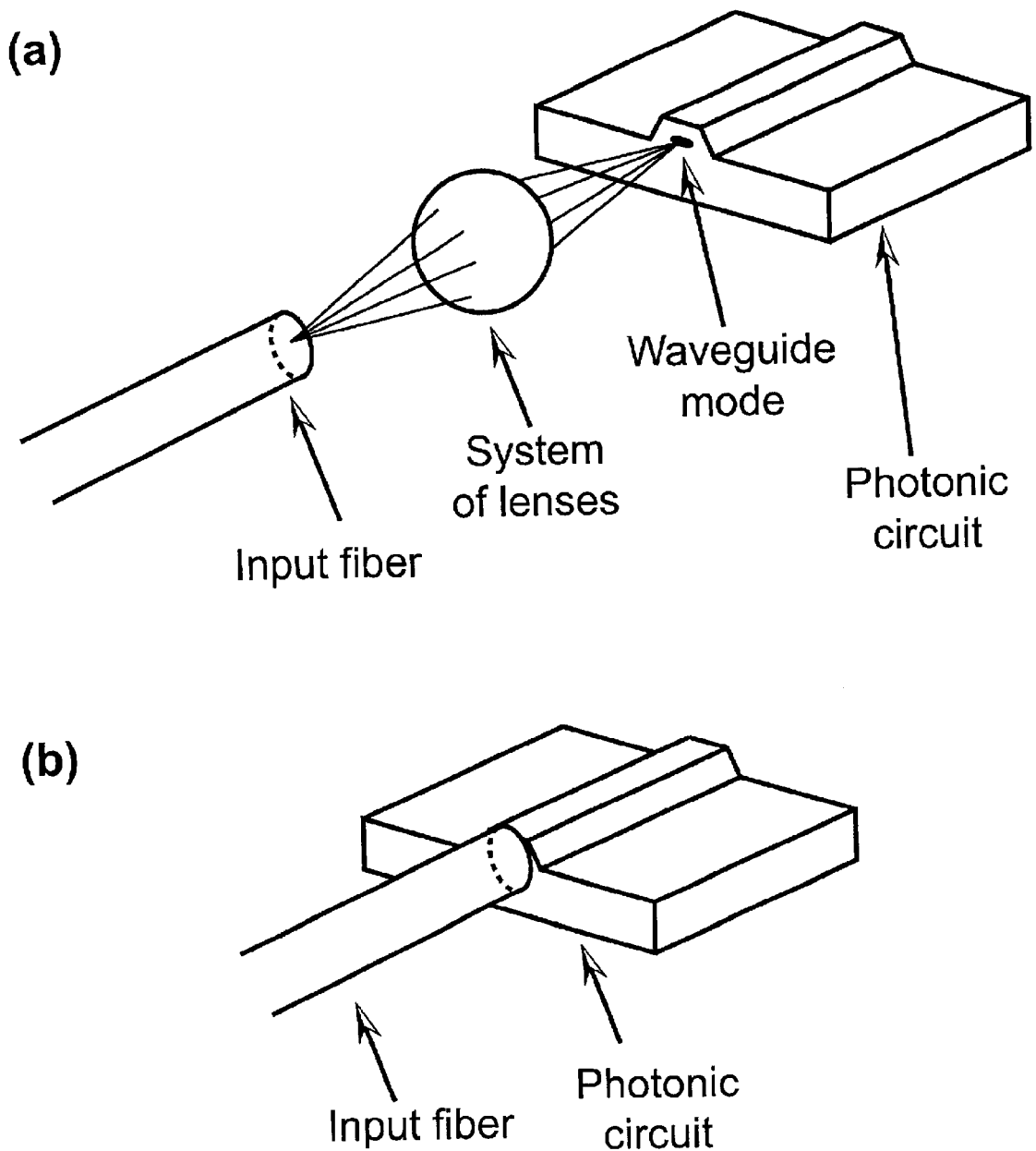
FIG. 1 is a schematic diagram showing conventional axial geometry for coupling light into a planar photonic waveguide by (a) a system of lenses, and (b) by direct fiber attachment.
Figure 2:
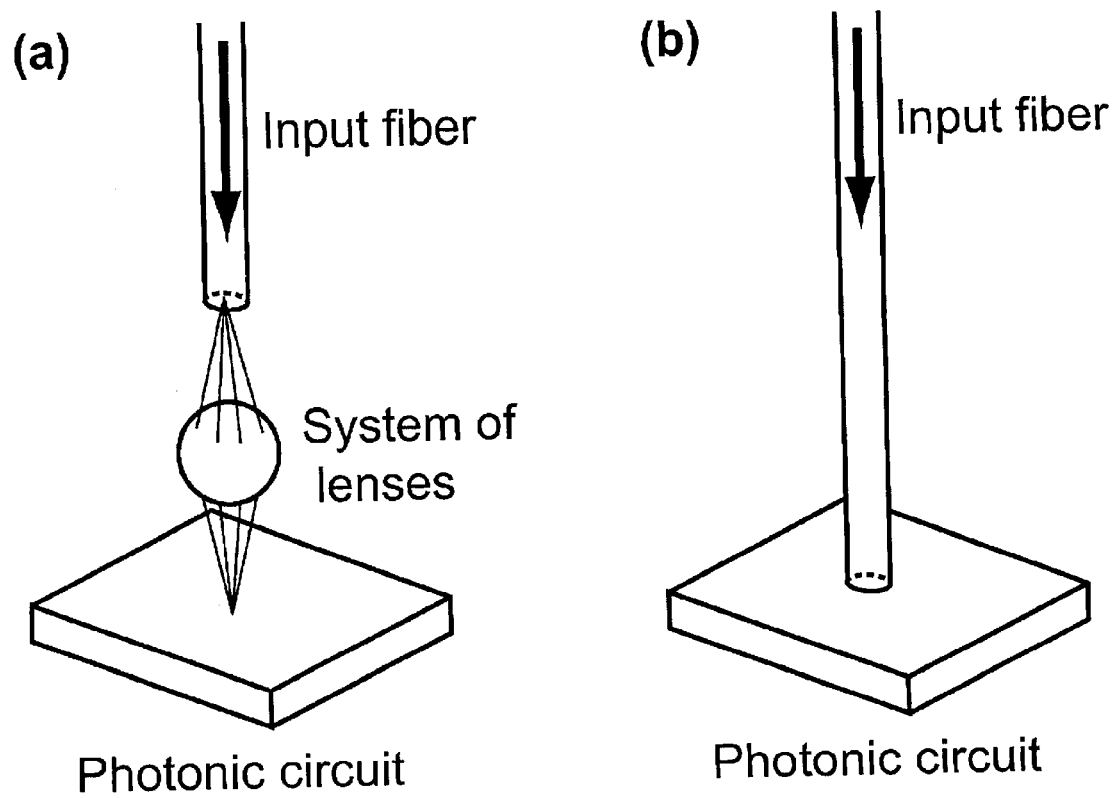
FIG. 2 is a schematic diagram showing normal-incidence coupling with (a) a system of lenses, and (b) direct fiber coupling.

The present I/O ports, which are suitable for incorporation into a photonic circuit, comprise (1) a layered structure comprising (a) an unpatterned superstrate having at least one layer, (b) an unpatterned substrate having at least one layer and (c) at least one intermediate layer sandwiched between the unpatterned superstrate and the unpatterned substrate, (2) a coupling region that is within the at least one intermediate layer and that comprises an arrangement of at least one optical scattering element and (3) at least one output waveguide to direct (that is, propagate) output light from the coupling region to another part of the photonic circuit. The present I/O ports can be effectively used in balanced photonic circuits and unbalanced photonic circuits.

The present I/O ports solve a number of the problems associated with coupling light from an optical fiber into a planar photonic circuit. Compared to prior I/O ports, the present I/O ports operate more effectively at higher coupling efficiency and over a broader bandwidth than any previously implemented, otherwise comparable I/O ports. The present I/O ports are capable of coupling light that enters the I/O ports at normal, near-normal and off-normal incidence (that is, within approximately 30° of the normal of the top (or bottom) plane of the photonic circuit), and are particularly effective at coupling light that enters the I/O ports at approximately 12° from the normal of the top (or bottom) plane of the photonic circuit. The present I/O ports are formed using an arrangement of higher refractive index contrast optical scattering elements. Several objects and advantages of the present I/O ports include:

a) effectively coupling a range of optical wavelengths;

b) coupling an incident or outgoing beam at a predetermined angle (for example, normal or near normal) to the surface of the coupler;

c) controlling (for example, maximizing) the in- and out-coupling of a Gaussian-like intensity profile, with a mode field diameter of approximately 10 $\mu$m or less; and d) controlling (for example, reducing) the insertion loss caused by, for example, a mismatch of effective indices across the output boundary(-ies) of the I/O port;

e) controlling (for example, reducing) the polarization dependence of I/O port characteristics such as insertion loss and transmission delay, which is the time delay incurred by an optical signal travelling through an I/O port.

Further objects and advantages of the present I/O ports will become apparent from a consideration of the accompanying drawings and description.

DETAILED DESCRIPTION OF PREFERRED EMBODIMENT(S)

The present I/O ports comprise a planar or substantially planar layered structure comprising an unpatterned superstrate having at least one layer, an unpatterned substrate having at least one layer and at least one intermediate layer, which is sandwiched between the unpatterned superstrate and the unpatterned substrate, a coupling region that is within the at least one intermediate layer and that comprises a pattern of at least one optical scattering element and at least one output waveguide to direct output light from the coupling region to another part of the photonic circuit. In operation, the coupling region is illuminated by external optical input (for example, input light from a fiber). From the coupling region, the light is directed (that is, propagated) to the at least one output waveguide, and, in some embodiments of the present I/O ports, the directing of that light is effected by at least one output region, which, like the rest of the elements comprising the present I/O ports, subsists in the layered structure. The at least one output region is specifically located between the coupling region and the at least one output waveguide. The at least one output region can also adapt the optical mode of the light that is exiting the coupling region and propagating across at least one output boundary to the optical mode of the light that is entering the at least one output waveguide.

Figure 3:
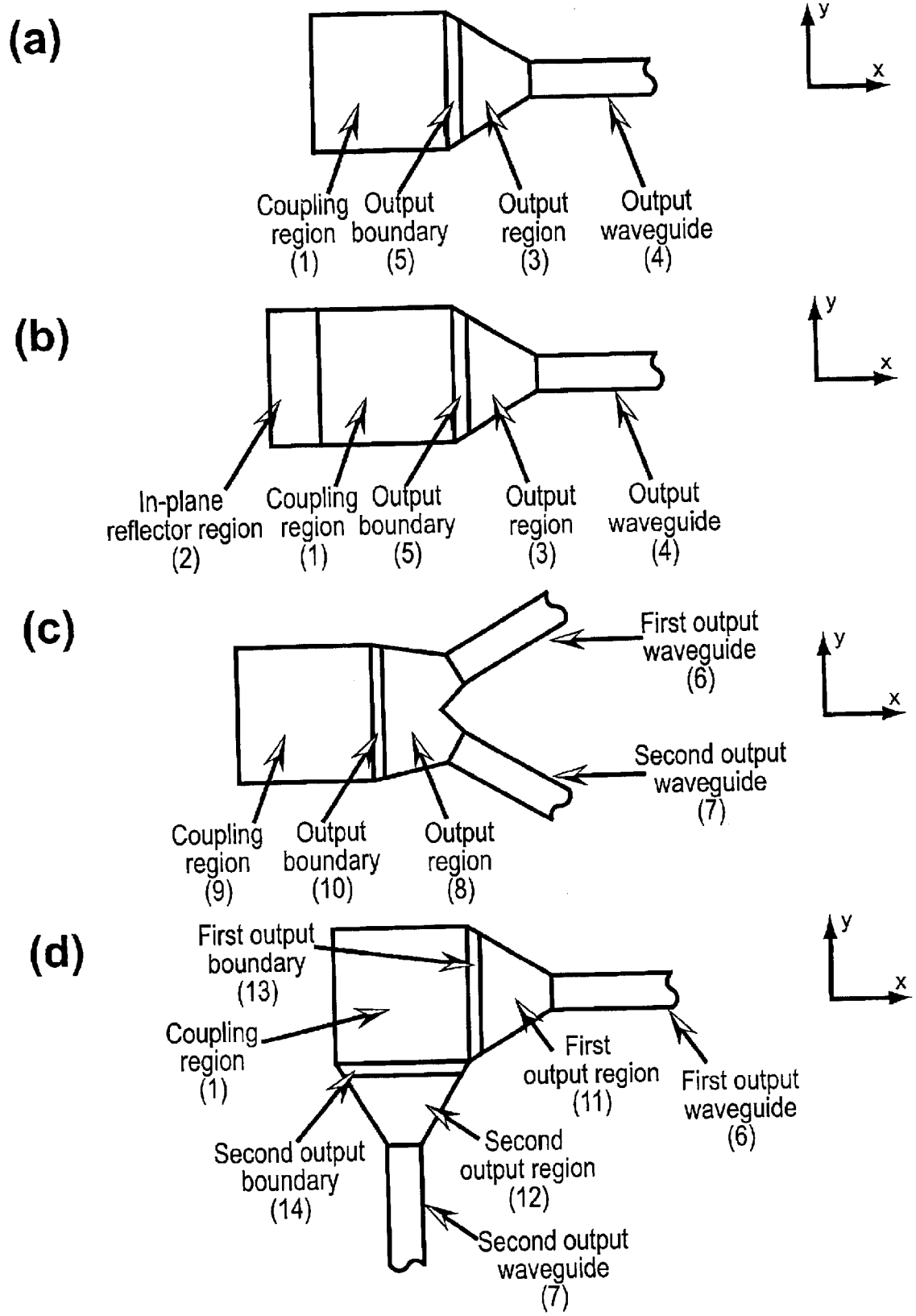
FIG. 3 is a plan-view schematic diagram of I/O port designs suitable for operation with light of a known, fixed input polarization (illustrated in (a) and (b)) and with light of an unknown or varying input polarization (illustrated in (c) and (d)).

Representative arrangements of a coupling region, at least one output region, and at least one output waveguide are illustrated in FIG. 3, which shows a number of I/O port arrangements in plan view. In FIG. 3, x and y represent directions in the plane of the structure, and input light is directed into the coupling region in the –z direction, or within approximately 30° of the –z direction, for normal or near-normal incidence, respectively. Alternatively, input light is directed into the coupling region from below the plane, in the +z direction, or within approximately 30° of the +z direction, for normal or near-normal incidence, respectively.

FIGS. 3(a) and (b) show I/O ports that feature a layered structure and are suitable for directing input light of a known polarization. FIG. 3(b) shows an arrangement especially suitable for light at normal incidence. In those I/O ports, light tends to exit each respective coupling region (1) in both the +x and –x directions, and, in FIG. 3(b), an in-plane reflector region (2), which also subsists in the layered structure and is located behind coupling region (1), redirects light exiting the I/O ports in the –x direction towards the output region (3) and thus towards the output waveguide (4). Each of the I/O ports of FIGS. 3(a) and (b) further comprises an output boundary (5). The output boundary (5) is defined to be the area of demarcation between the coupling region (1) and the output region (3). FIGS. 3(c) and (d) show I/O ports suitable for input light of an unknown or varying polarization. In those I/O ports, light is ultimately directed towards a first output waveguide (6), a second output waveguide (7), or both output waveguides (6, 7) depending upon the light's polarization. FIG. 3(c) shows a single output region (8), with light exiting coupling region (9) and crossing a single output boundary (10). FIG. 3(d) shows an I/O port that is preferred for directing light into first output region (11) and second output region (12), and then into first and second output waveguides (6, 7), respectively, which are arranged to be approximately orthogonal or orthogonal to one another within a plane. The I/O port shown in FIG. 3(d) further comprises first output boundary (13) and second output boundary (14), respectively. By analogy to FIG. 3(b), the arrangements in FIGS. 3(c) and (d), which are especially suitable for use with light at off-normal incidence, can be adapted for input at normal incidence by inclusion of one or two in-plane reflector regions, respectively. An in-plane reflector region comprises in-plane reflecting elements and, depending on the overall design of an I/O port, an in-plane reflector region may comprise more than one in-plane reflecting element. Suitable in-plane reflecting elements include two-dimensional planar photonic crystal elements and high index contrast etched reflectors.

Figure 16:
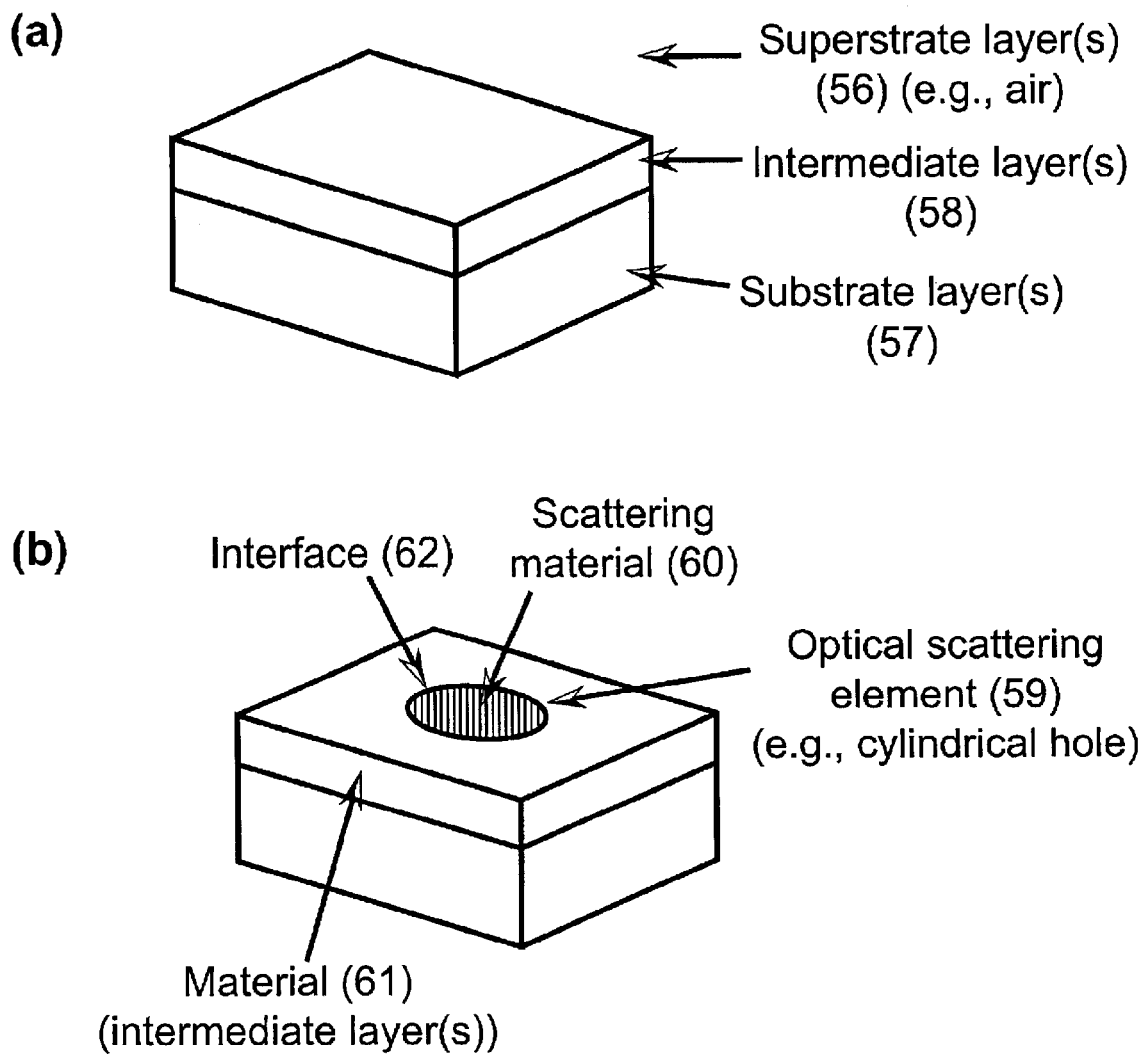
FIG. 16(a) is a schematic diagram showing unpatterned superstrate layer(s), unpatterned substrate layer(s) and intermediate layer(s), which are not yet patterned, of the present I/O ports.
FIG. 16(b) is a schematic diagram showing the same layers as FIG. 16(a) plus a single optical scattering element (namely, a cylindrical hole) in the intermediate layer(s).

The present I/O ports may be fabricated as a layered structure by such patterning techniques as optical lithography, etching and deposition. For example and as shown in FIG. 16(a), the layered structure may comprise one or more superstrate layers (56), one or more substrate layers (57), and one or more intermediate layers (58) sandwiched between the one or more superstrate layers (56) and the one or more substrate layers (57). The present I/O ports feature appropriate arrangements of appropriate optical scattering elements that are incorporated into at least one intermediate layer. As explained above, in the present I/O ports, a coupling region lies within the at least one intermediate layer. Notably, the output boundary, which was defined above, is further characterized by the absence of optical scattering elements on the outer edge of the output boundary, with the outer edge of the output boundary defined to be the portion of the output boundary that is adjacent to or near the output region. Herein, a layered structure can be further characterized by the properties of its constituent layers prior to any patterning. Those properties include the respective thicknesses and material compositions of the layers. Particular considerations relating to the sequence of fabrication steps that may be useful in fabricating the present I/O ports are described later in this specification.

As stated above, appropriate optical scattering elements can be appropriately arranged within the layered structures of the present I/O ports. An optical scattering element comprises a scattering material, material surrounding the scattering material and an interface between the scattering material and the material surrounding the scattering material. The effect of the interface is that the index of refraction is not constant in the x-y plane. In other words, the index of refraction for the scattering material is different than the index of refraction for the material. By way of example, and as shown in FIG. 16(b), an appropriately selected optical scattering element (59) may be a cylindrical hole comprising air as a scattering material (60), material (61) surrounding (that is, forming a boundary around) the scattering material (60) and an interface (62) between the scattering material (60) and the surrounding material (61). The volume of a scattering element is actually the volume of the scattering element's scattering material (60). The intermediate layer(s) of the present I/O ports comprise one or more materials, such as the material (61). An appropriate material for an intermediate layer may be GaAs (that is, gallium arsenide). As shown in FIG. 16(b), an example of an optical scattering element is a cylindrical hole within a layered structure. Optical scattering elements of various geometries (and various volumes) can be incorporated into the present I/O ports, depending upon the application. Another example of an optical scattering element is a rectangular trench.

One feature of the present I/O ports that can further distinguish them from prior I/O ports is that the index contrast in the coupling region (that is, the index contrast of the optical scattering elements), $\Delta n$, is relatively high, preferably greater than or equal to approximately 1. Prior work has concerned lower index contrast optical scattering elements, which can result in such problems as an unacceptable restriction on the operating bandwidth of the I/O port, unacceptable restriction on the coupling efficiency of the I/O port, relatively high sensitivity to angular misalignment of the input light with respect to the I/O port, or a combination of some or all of those problems.

Figure 4:
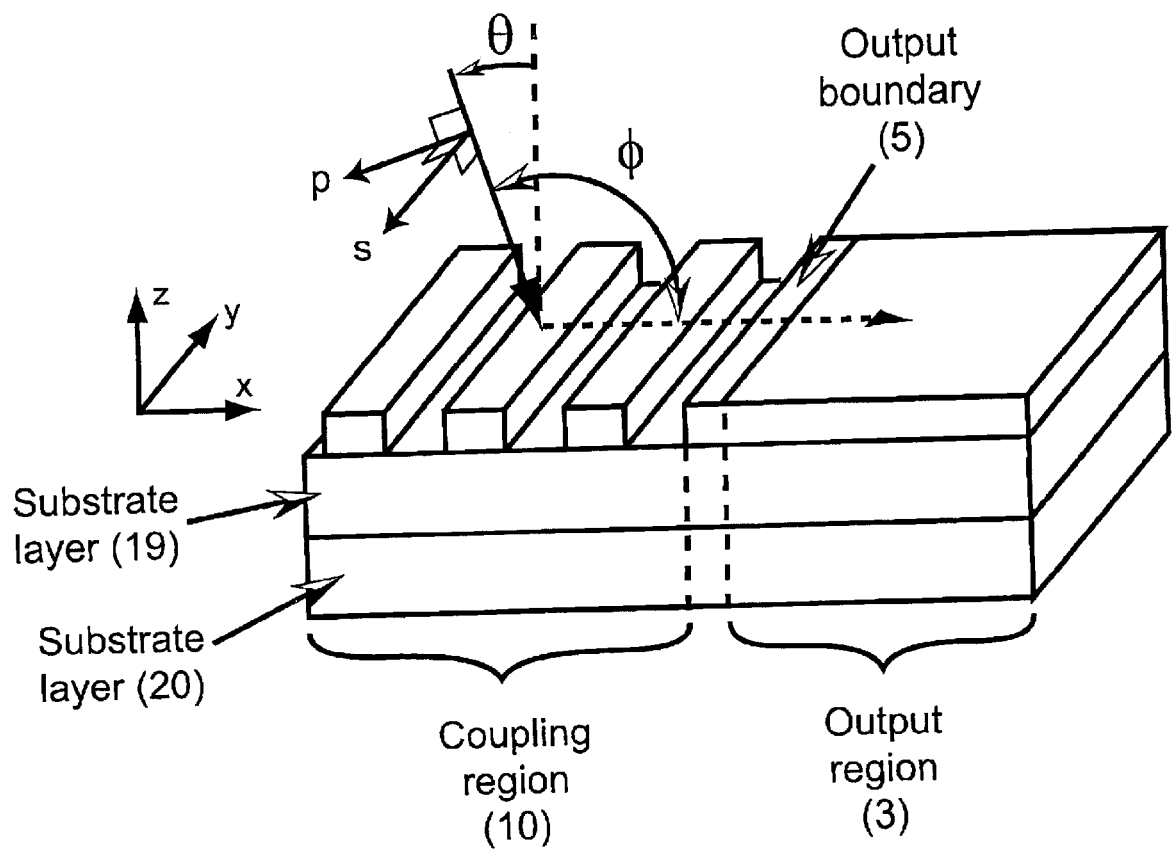
FIG. 4 shows an illustrative view of a portion of an I/O port corresponding to FIG. 3(a).

There are several preferred arrangements of optical scattering elements within the coupling regions of the present I/O ports. Some of those preferred arrangements are suitable for use with input light of a known, fixed polarization. I/O ports that feature those preferred arrangements would be useful, for example, with polarization-preserving fiber inputs. In one preferred embodiment of the present I/O ports, which embodiment is depicted in FIG. 3(a), light is incident upon the coupling region as a result of suitable positioning of the input fiber. The propagation of light through the I/O port embodied in FIG. 3(a) is depicted in FIG. 4. As shown in FIG. 4, light is incident upon the coupling region (1) at an angle $\theta$ with respect to the normal. That light may be polarized in either the "s" or "p" direction, as indicated in FIG. 4, or in some combination of those two directions. The optical output from the coupling region (1) propagates across the output boundary (5) and into the output region (3) at an angle $\phi$ with respect to the input beam. In the case of off-normal incidence, a forward I/O port is defined as one in which light emerges from the coupling region (1) in a direction where $\phi>90°$. Conversely, a backward I/O port, in the case of off-normal incidence, is defined as one in which light emerges from the coupling region (1) in a direction where $\phi<90°$. Off-normal incidence is usually the preferred configuration for a planar or substantially planar photonic circuit because off-normal incidence facilitates achieving optical output from the coupling region in a substantially single direction. Achieving effective optical output from the coupling region in a substantially single direction is dependent upon appropriate arrangement of appropriate optical scattering elements within the coupling region. Compared to operation at off normal incidence, operation at normal or near normal incidence can make it relatively difficult to achieve output from the coupling region in a substantially single direction. In fact, in order to achieve such output while operating at normal incidence, one or more in-plane reflector regions (2) as illustrated in FIG. 3(b), often have to be incorporated into the photonic circuit. An in-plane reflector region (2), such as illustrated in FIG. 3(b), and the associated traversal of the coupling region by light redirected by the reflector, can result in a decrease in effective coupling, or equivalently, increased insertion loss. A further advantage of operating at off-normal incidence is that any reflection from the surface of the coupler will not be directed back toward the input, thereby reducing back reflection from the I/O port (with back reflection from the I/O port being defined as reflection of input light from the I/O port back into the input fiber). For compatibility with standardized angle-polished fibers, the operating angle $\theta$ can properly be chosen to be approximately 12°. Taking into account refraction of light at the end of a fiber, such an operating angle is appropriate for conventional angle-polished fibers, which are polished at an angle of approximately 8° from the longitudinal axis of the fiber. Where an optical fiber is directly attached to an input/output port, the angle $\theta$ can properly be chosen to be approximately 8°.

Analysis of the preferred embodiments described below is achieved by one of several analysis techniques well known to one skilled in the art. We employ a self-consistent Green's function technique that accurately describes the optical properties of arbitrarily thick, high dielectric contrast gratings in the planar waveguide geometry (See Cowan et al, "Resonant scattering and mode coupling in 2D textured planar waveguides," *J. Opt. Soc. Amer.* A18, (5), pp. 1160–1170, May 2001.) The Green's function technique is useful, in conjunction with coupled-wave equations, for approximating the behavior of the present I/O ports. Finite-difference time-domain (FDTD) is another technique that is useful in quantitatively accounting for the effects of input mode field diameter and nonuniform arrangements of optical scattering elements.

FIG. 5(a) illustrates a preferred embodiment of a coupling region (1) for a present I/O port operating with light at a single polarization. In FIG. 5(a), optical scattering elements (15) (that is, rectangular trenches) are in a uniform (in particular, and by way of example, a symmetrical) arrangement, with each optical scattering element (15) having a depth, $d_1$, of approximately 180 nm, a pitch, $\Lambda$, of approximately 860 nm, and a width, b, defined by a duty cycle, b/$\Lambda$, of approximately 0.3. A uniform arrangement of optical scattering elements is an arrangement of optical scattering elements wherein each of the optical scattering elements has the same or approximately the same volume and is evenly or approximately evenly spaced from each neighboring optical scattering element. Underneath the optical scattering elements, the substrate comprises an unpatterned substrate layer (16), in this case and for example, comprising $Al_xO_y$, that has a thickness, $t_1$, of approximately 1150 nm and a GaAs layer (17), which is located below the substrate layer (16) and serves as partial reflector beneath the coupling region and also as a physical support for the I/O port. We take the refractive indices of GaAs and $Al_xO_y$ to be approximately 3.35 and 1.60, respectively.

Figure 5:
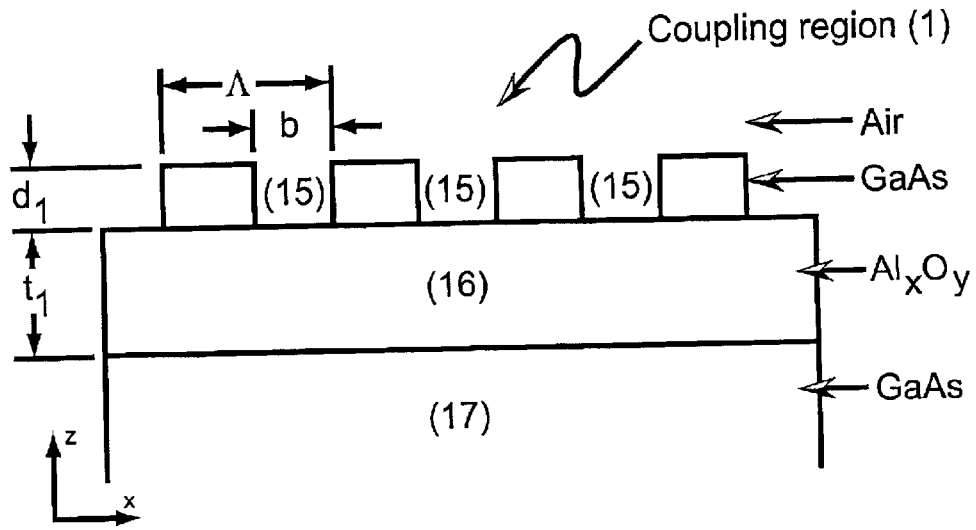
FIG. 5 is a schematic diagram showing (a) a preferred embodiment high index contrast I/O port, and (b) a conventional low index contrast I/O port.
Figure 5:
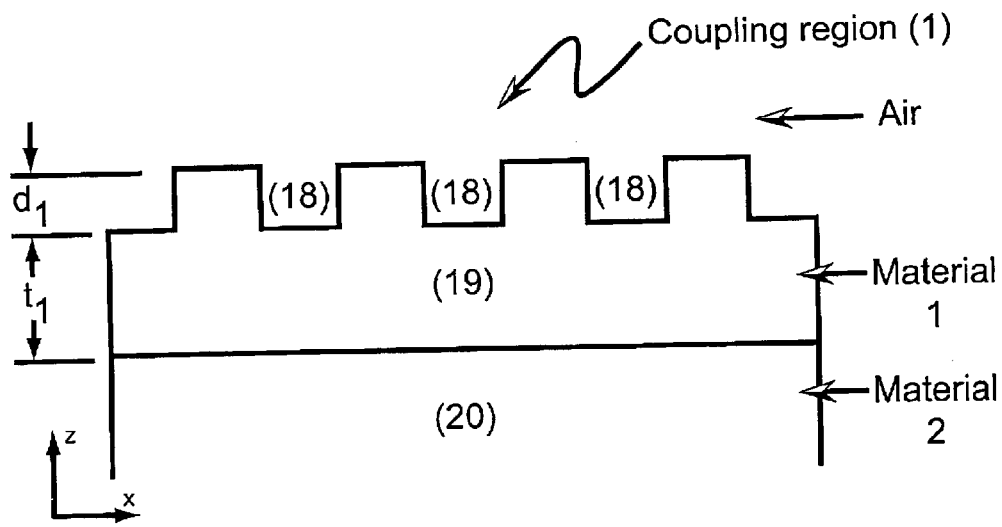
Figure 6:
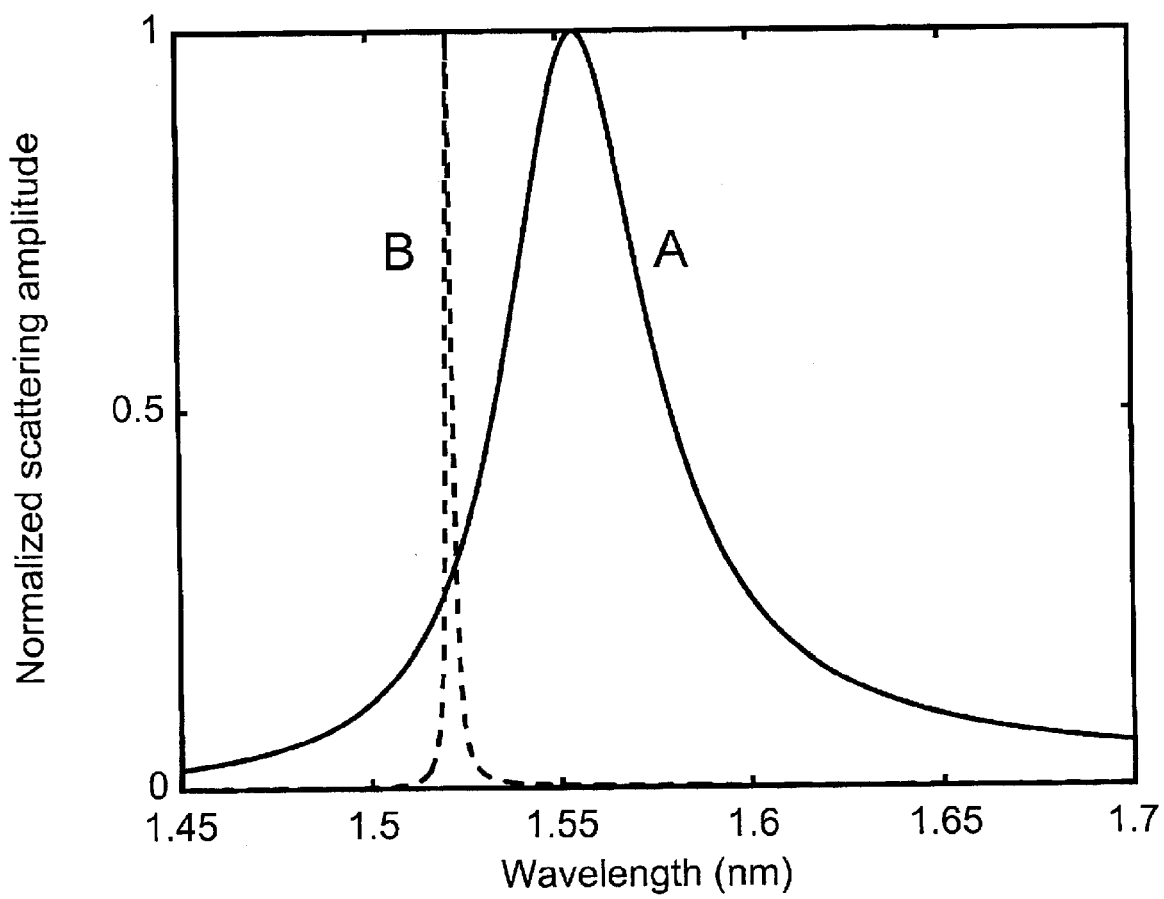
FIG. 6 is a plot showing first order scattering amplitudes as a function of wavelength. The two curves denoted by A and B show results for the I/O ports of FIGS. 5(a) and (b), respectively.

For comparison, FIG. 5(b) shows a comparable coupling region for a prior I/O port, with that coupling region comprising low index contrast optical scattering elements. The structure of that coupling region, with optical scattering elements (18) and substrate layers (19, 20) is similar to the structure described in FIG. 10 of "Analysis and design of grating couplers," T. Tamir and A. T. Peng, Appl. Phys. 14, pp. 235–254 (1977). In this example of prior work, the refractive index of Material 1 and the refractive index of Material 2 are taken to be approximately 1.732 and 1.517, respectively. In FIG. 5(b), each optical scattering element (18) has a depth, $d_1$, of approximately 180 nm and material (19) has a layer thickness, $t_1$, of approximately 500 nm. One advantage that the present I/O ports have over such prior work is illustrated in FIG. 6 for incidence at an angle of θ=10°, which angle corresponds to a forward I/O port. As illustrated in FIG. 6, input light is polarized with its electric field along the length of the bars (that is, s-polarized as indicated in FIG. 4) and the output light from the coupling region is polarized with its electric field in the plane of the layers. FIG. 6 shows the square of the magnitude of the first order scattering amplitude as a function of wavelength, where curve A is for the high index contrast I/O port of FIG. 5(a) and curve B is for the conventional I/O port (that is, conventional grating coupler) of FIG. 5(b). Note that those curves correspond to structures where each optical scattering element has the same depth of approximately 180 nm. Since coupling efficiency is proportional to the square of the scattering amplitude, the widths of the peaks shown are indicative of the operational bandwidth of the I/O ports. The FWHM of the coupling amplitude of a conventional I/O port is approximately 2 nm, while the FWHM for the preferred embodiment discussed above is approximately 50 nm. This improvement, by a factor of 25, is due to the strong optical scattering achieved with high index contrast optical scattering elements.

Figure 7:
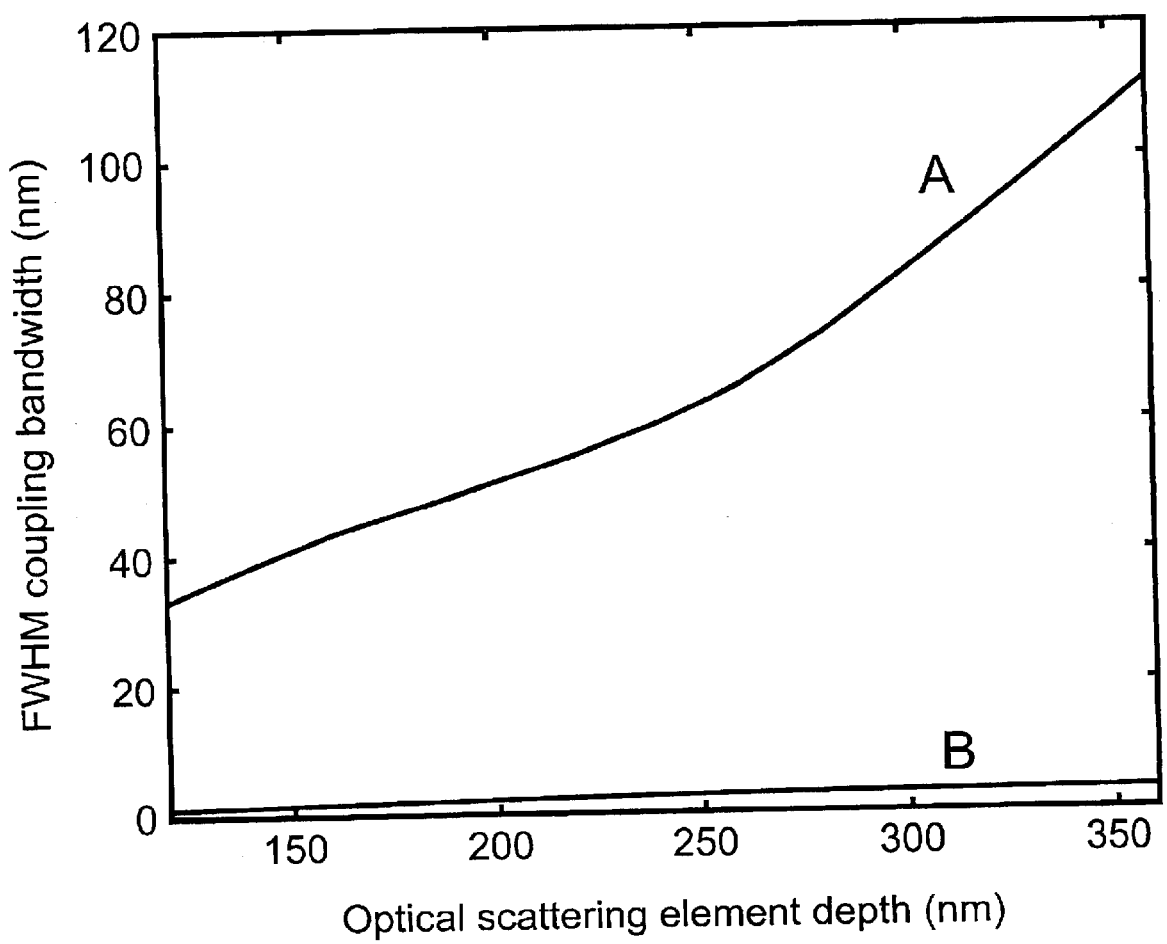
FIG. 7 is a plot showing full width half maximum (FWHM) coupling bandwidth as a function of optical scattering element depth. The two curves denoted by A and B show results for the I/O ports of FIGS. 5(a) and (b), respectively.

As stated above, it is also important to control the operational (that is, the effective coupling) bandwidth of an I/O port. One approach that may be used to increase the operational bandwidth of either of the I/O ports set forth in FIG. 5 is to increase the volume of the optical scattering elements (by, for example, increasing the depth of the optical scattering elements). However, because of practical limitations to current etching techniques that approach has not produced generally acceptable results. In addition, for conventional I/O ports, it is well known that the operational coupling bandwidth saturates when the depths of the optical scattering elements increase. FIG. 7 shows the FWHM coupling bandwidth determined from the scattering amplitude as a function of the optical scattering element depths, $d_1$, for the two I/O ports of FIG. 5. FIG. 7 illustrates another advantage of the present I/O ports, namely, control over the operational bandwidth of an I/O port. In particular, curve B of FIG. 7 shows that the bandwidth of a conventional I/O port saturates at a maximum value of approximately 4 nm, whereas curve A shows that a much larger (and, as such, much more controllable) operational bandwidth can be achieved with the present I/O ports. In fact, a coupling bandwidth greater than 100 nm can be achieved for high dielectric contrast structures that feature optical scattering elements with depths larger than approximately 350 nm.

Figure 8:
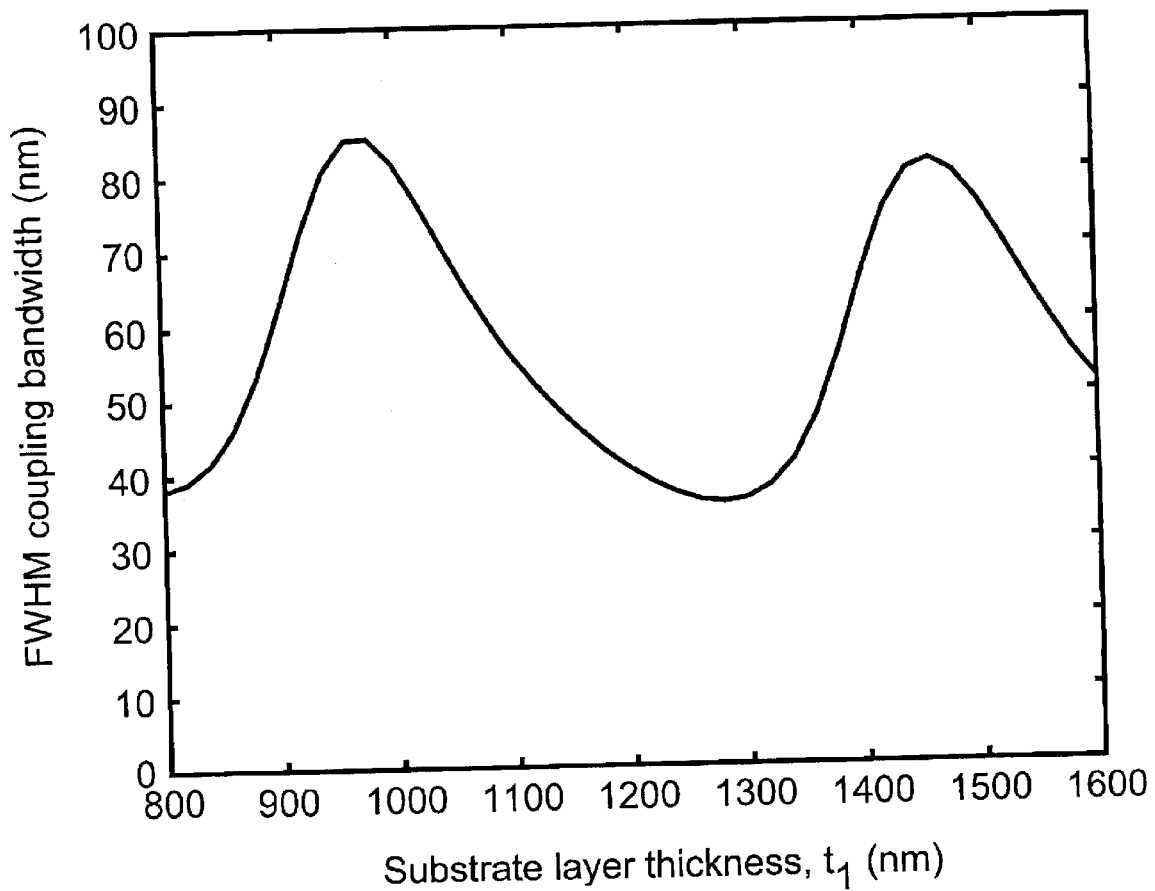
FIG. 8 is a plot showing FWHM coupling bandwidth as a function of the substrate layer (16) thickness, $t_1$, for the I/O port of FIG. 5(a).

The present I/O ports provide additional design flexibility and advantages over prior I/O ports. More specifically, the present I/O ports achieve more effective control over the operational bandwidth of a photonic circuit because the present I/O ports comprise a layered structure with layers of appropriately selected thicknesses. For example, FIG. 8 shows the FWHM coupling bandwidth for the I/O port of FIG. 5(a) as a function of the substrate layer (16) thickness, $t_1$. By appropriate selection of the substrate layer (16) thickness, $t_1$, the FWHM coupling bandwidth may be further increased (by a factor of two in the example of FIG. 8).

Figure 9:
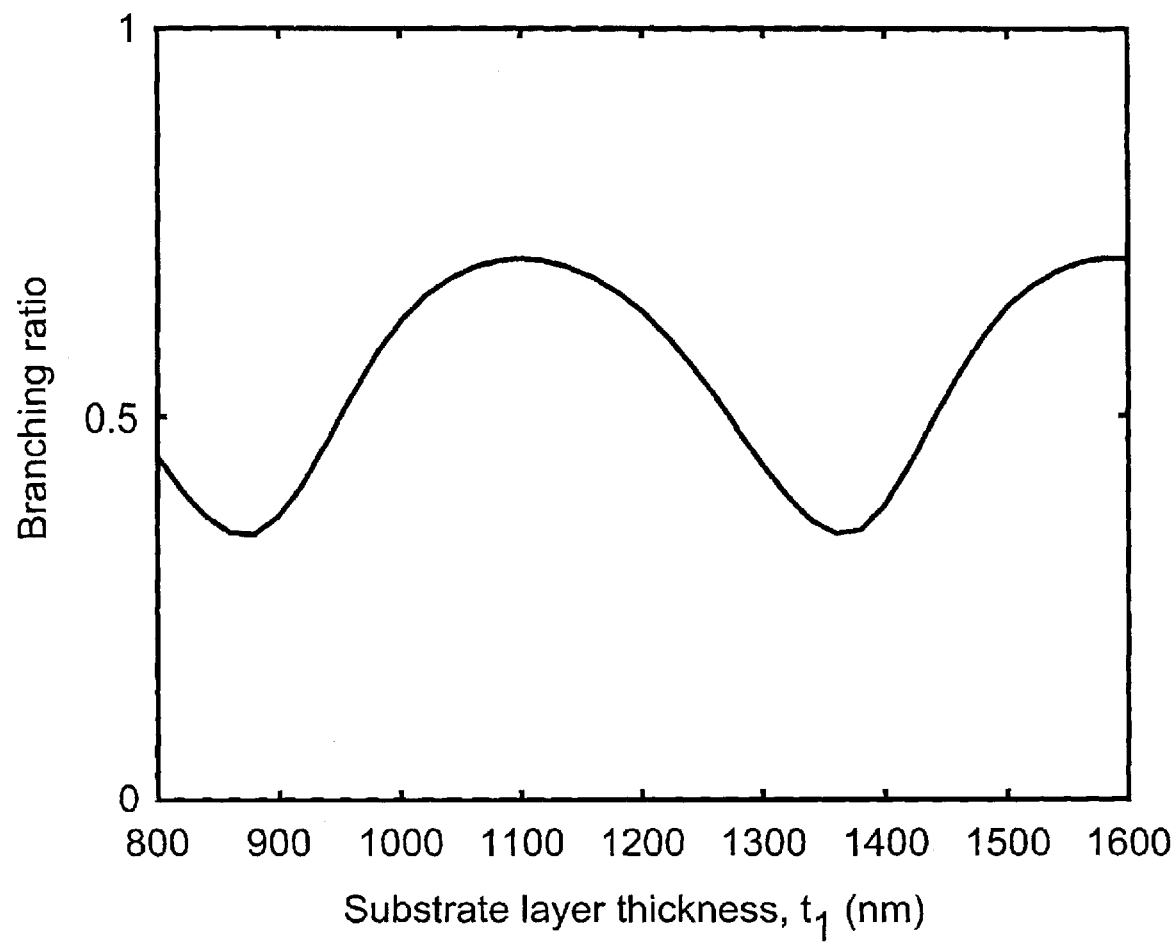
FIG. 9 is a plot showing branching ratio as a function of the substrate layer (16) thickness, $t_1$, for the I/O port of FIG. 5(a).

Another point to recognize is that, as a guided mode of light propagating in the coupling region interacts with optical scattering elements, some of the light is lost (that is, radiated away towards the superstrate or the substrate). The branching ratio (BR), defined as the fraction of the total input light that radiates in the direction of interest for coupling, quantifies the magnitude of such a loss. An ideal I/O port will have a branching ratio of unity. In the present I/O ports, the branching ratio may, as indicated above, be controlled by appropriately selecting layer thickness(es) for the superstrate, the substrate or both. FIG. 9 shows the branching ratio as a function of the substrate layer (16) thickness, $t_1$, for the I/O port of FIG. 5(a). Because a large BR is desirable for maximizing overall coupling efficiency of an I/O port, the substrate layer (16) thickness, $t_1$, may be employed to optimize this parameter as well. Examination of FIGS. 8 and 9 shows that by appropriately selecting the thickness of only a single layer, the coupling bandwidth and the branching ratio are both affected simultaneously. However, for a given layered structure, the branching ratio is not sensitive to commensurate changes in the pitch and duty cycle of the arranged optical scattering elements, while the coupling bandwidth is highly sensitive to such changes. The calculations in FIGS. 8 and 9 show that for the structure of FIG. 5(a) with Λ=approximately 860 nm and b/Λ= approximately 0.3, the branching ratio is approximately 0.68 and the coupling bandwidth is approximately 46 nm. Similar calculations for a structure with Λ=approximately 775 nm and b/Λ=approximately 0.2, show that the branching ratio is the same, approximately 0.68, but the coupling bandwidth decreases to approximately 18 nm. Thus, by coordinating the design of the substrate and superstrate layers with the design of the coupling region comprising at least one optical scattering element, the overall coupling efficiency of the I/O port and the coupling bandwidth may be controlled independently.

Also, the larger coupling bandwidth associated with a higher index contrast I/O port results in reduction of the angle sensitivity of the I/O port. For example, in an I/O port with a uniform arrangement of otherwise appropriate optical scattering elements, the acceptance angle of the I/O port is related to the bandwidth by $\Delta\theta \approx \Delta\lambda/(\Lambda\cos\theta)$, where θ is the optimum coupling angle and Λ is the optical scattering element pitch. Thus, for reasons the same as or similar to those given above, by coordinating the design of the superstrate layer(s) and substrate layer(s) with the design of the coupling region that is within the intermediate layer(s), the angle sensitivity of the I/O port may also be controlled.

Compared to prior work, the present I/O ports significantly reduce the input mode field diameter for effective coupling, thereby facilitating direct connection of the I/O ports to conventional optical fibers. Indeed, such facilitated direct connections reduce, if not eliminate, the need for intermediate optical elements, such as systems of lenses, between the I/O ports and fibers.

Figure 10:
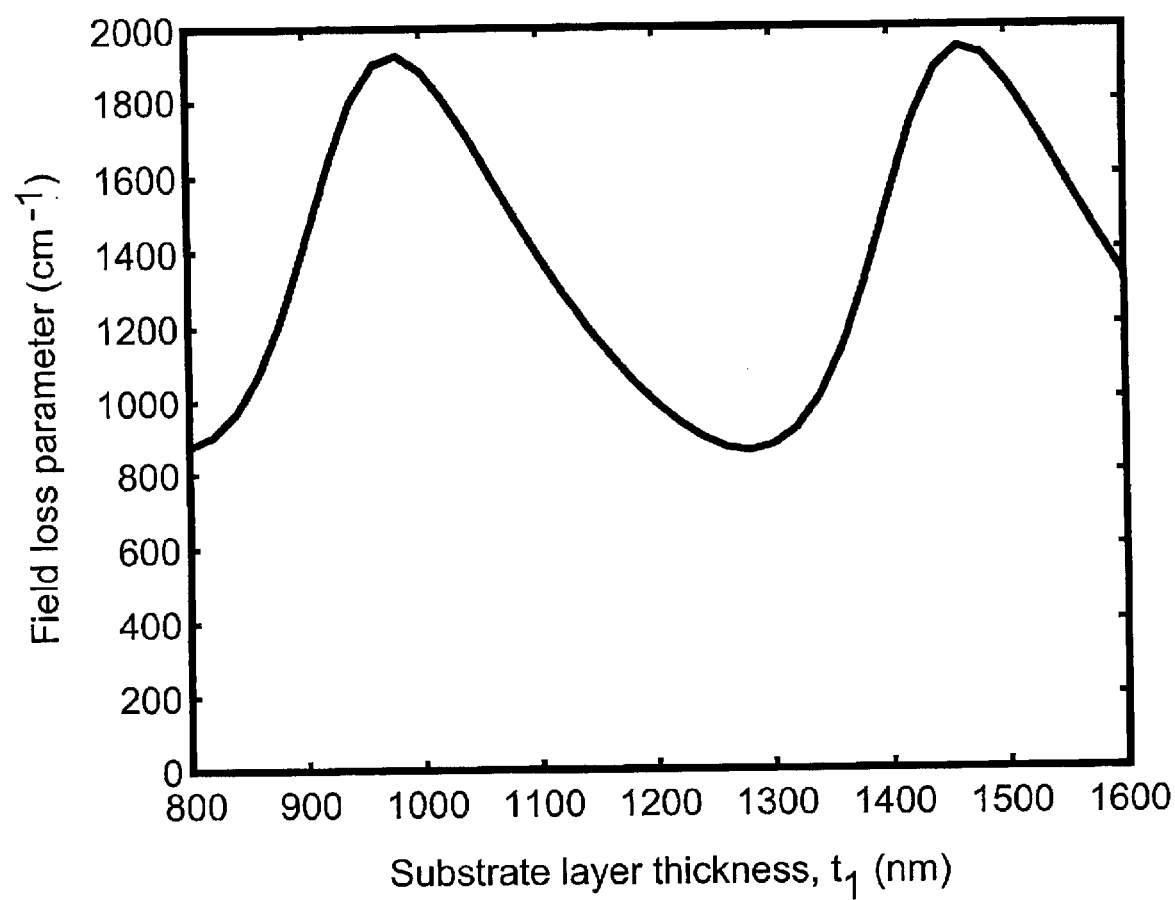
FIG. 10 is a plot showing variation in the field loss parameter as a function of the substrate layer (16) thickness, $t_1$, for the I/O port of FIG. 5(a).

It is well known that, for I/O ports with a uniform arrangement of optical scattering elements, there exists a mode field diameter that has maximum coupling efficiency, and that this mode field diameter is inversely related to the power loss parameter, $\alpha_p$, that characterizes the coupling region. Another parameter typically used to describe I/O ports is the field loss parameter, $\alpha=\alpha_p/2$. The typical mode field diameter of a beam exiting an optical fiber is approximately 10 μm and, therefore, in this case, the optimum value for the field loss parameter is α=approximately 1330 cm$^{-1}$. FIG. 10 shows the variation in field loss parameter for the high dielectric contrast I/O port of FIG. 5(a), with Λ=775 nm and b/Λ=0.2, as a function of the substrate layer thickness (16). As shown in FIG. 10, the appropriate field loss parameter for an approximately 10 μm mode field diameter can be obtained by appropriate selection of the substrate layer (16) thickness, $t_1$. Again, coordinating the design of the superstrate layer(s) and substrate layer(s) with the design of the coupling region that is within the intermediate layer(s) allows one to effectively control the field loss parameter and, thus, the optimum coupling mode field diameter, independent of the bandwidth of the I/O port.

We now turn to preferred embodiments of the present I/O ports that are suitable for effective coupling of input light of unknown or varying polarization. Under such circumstances, one generally seeks I/O port performance that does not significantly vary with any change in input polarization. Common parameters to measure such variance (or lack thereof) include PDL, which measures the maximum variation of the insertion loss as the input light varies over all possible polarization states. In addition (or alternatively), polarization mode dispersion (PMD) may be used to measure any variation in delay experienced by an input signal. PMD specifically measures the maximum variation in delay for input light passing through an I/O port, and that variation is measured over all possible polarization states.

FIG. 3(c) illustrates a preferred embodiment I/O port. For reasons the same as or similar to those set forth above, in the preferred embodiment of FIG. 3(b), off-normal incidence simplifies the design and improves the performance of the I/O port such that the I/O port effectively couples input light of unknown or varying polarization. As explained above, suitable ranges of angles of incidence for input light are approximately −30°≦θ≦approximately −1° and approximately 1°≦θ≦approximately 300 (that is, off-normal incidence).

Figure 11:
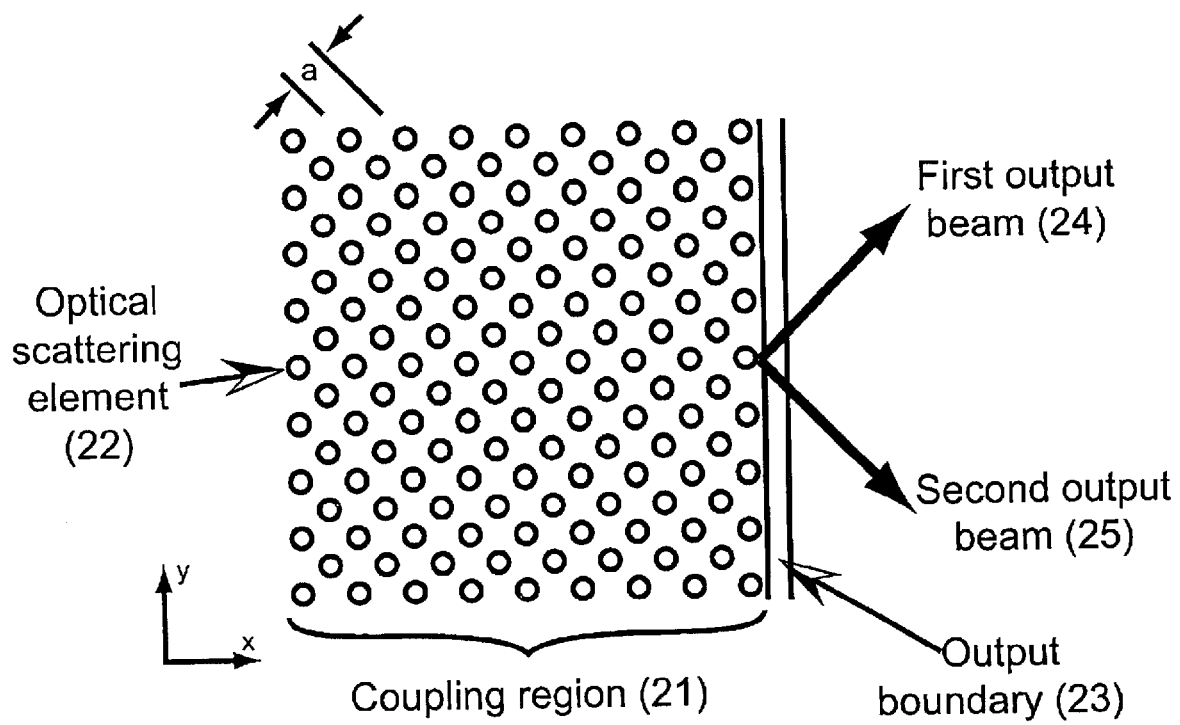
FIG. 11 is a plan view schematic of the coupling region of a preferred embodiment I/O port suitable for use with light of unknown or varying input polarization.

FIG. 11 depicts a coupling region (21) for a forward I/O port, with θ=approximately 12°. In FIG. 11, the optical scattering elements are cylindrical holes (22) that are in a uniform arrangement (specifically, and for example, the cylindrical holes (22) are in a square lattice and have a pitch, a, of approximately 740 nm). The axes of the square lattice are oriented at 45° to the x and y axes. Light from the coupling region (21) crosses an output boundary (23) in the +x direction, which is the M symmetry direction of the square lattice. The light propagates away from the output boundary (23) as first output beam (24), second output beam (25) or both first and second output beams (24, 25). Although not shown in FIG. 11, the layered structure of an I/O port (with the illustrated coupling region) may comprise a first intermediate layer of GaAs, with a thickness of approximately 180 nm, and a second intermediate layer of $Al_xO_y$, with a thickness of approximately 300 nm. The substrate comprises an upper substrate layer of $Al_xO_y$, with a thickness of approximately 850 nm, and a lower substrate layer of GaAs. The optical scattering elements extend through the intermediate layers of GaAs and $Al_xO_y$. Each of the cylindrical optical scattering elements has a radius of approximately 188 nm. In this embodiment of the present I/O ports, the power loss parameter for any input polarization is approximately 2000 cm$^{-1}$, thereby effectively matching an optical mode field diameter of approximately 14 μm over a range of frequencies within the C-band, while simultaneously achieving low polarization dependent loss.

Having described the above features of the present I/O ports in controlled polarization and varying or unknown polarization applications, it is now appropriate to consider additional features that can be incorporated into the present I/O ports.

There are several types of light loss (including scattering of light out of the desired optical path and general dissipation of light as it propagates). Of course, any such loss interferes with the effectiveness of an I/O port.

A more specific type of loss occurs as a result of reflection of light when light emerges from the coupling region and crosses an output boundary. Such reflection can occur if there is a mismatch between the guided mode of light in the coupling region and the guided mode of light in the output region. That reflection is due, in part, to the difference between the effective refractive index for the coupling region and the effective refractive index(-ices) for the at least one output region. The effective refractive index, $n_e$, is defined by the ratio of the spatial frequency in the material (or wavevector, k) to the angular optical frequency of oscillation, ω, times the speed of light in vacuum, c, that is, $n_e$ =kc/ω). Mode profile mismatch, which is defined to be a difference between two modes' spatial distribution of optical intensity, can also contribute to loss of light (with loss of light being reduced transmission of light into the output region). In prior lower-index-contrast I/O ports (or grating couplers), the amount of loss in crossing the output boundary was relatively small. However, the amount of that loss can be significant in I/O ports comprising high-index-contrast optical scattering elements.

To eliminate a mismatch between the respective refractive indices, mode matched material may be employed in the output region of the planar photonic crystal. For example, by etching a two-dimensional arrangement of holes into an initially unpatterned layer structure, a planar photonic crystal waveguide may be fabricated adjacent to a high dielectric contrast I/O port. By selecting appropriate pitch and symmetry for that arrangement, and selecting appropriate volume(s) for those holes, the effective refractive index of the planar photonic crystal waveguide may be engineered to be approximately equal or equal to the effective refractive index of the high dielectric contrast I/O port at a given wavelength. By selecting the lattice constant of the planar photonic crystal material to be less than $\lambda/(2n_e^c)$, where λ is the free-space wavelength of the input light and $n_e^c$ is the effective index in the coupling region, the mode of light in the output region can be propagated substantially without loss or lossless.

Another way to control reflection at the output boundary is to utilize an output waveguide that is unpatterned or substantially unpatterned (for example, a ridge waveguide). Such an approach requires that the effective refractive index of the coupling region is approximately equal to the effective refractive index of the output region, and particularly in the area near or at the output boundary. This approach can be implemented by gradually reducing (to zero) the volume of each of the optical scattering elements near or at the output boundary. In other words, as the optical scattering elements gradually approach the area near or at the output boundary, the volume of those optical scattering elements is gradually (that is, progressively) reduced such that the volume of a given optical scattering element is sufficiently less than the volume of another optical scattering element located further from the output boundary (and towards or into the coupling region). In one preferred embodiment of the present I/O ports, the structure of the coupling region is eventually the same as the structure of the area beyond the output boundary. That area may, for example, be the output region. The effective index of the coupling region and that area match where the respective structures match, and such matching specifically occurs where the volume of the optical scattering elements has decreased to zero (that is, when the optical scattering elements no longer exist). For such an I/O port, the vertical waveguide mode profile will also be matched across the output boundary.

Prior work on I/O ports has established that, in connection with controlling (for example, maximizing) coupling efficiency, there is a relationship between the spatial variation of the input beam intensity profile and the spatial variation of the power loss parameter. In particular, and in the case of coupling regions comprising a uniform arrangement of optical scattering elements, prior work on I/O ports has established that the resulting constant power loss parameter is not well matched to the Gaussian-like mode profile that emerges from a typical single-mode optical fiber.

Figure 12:
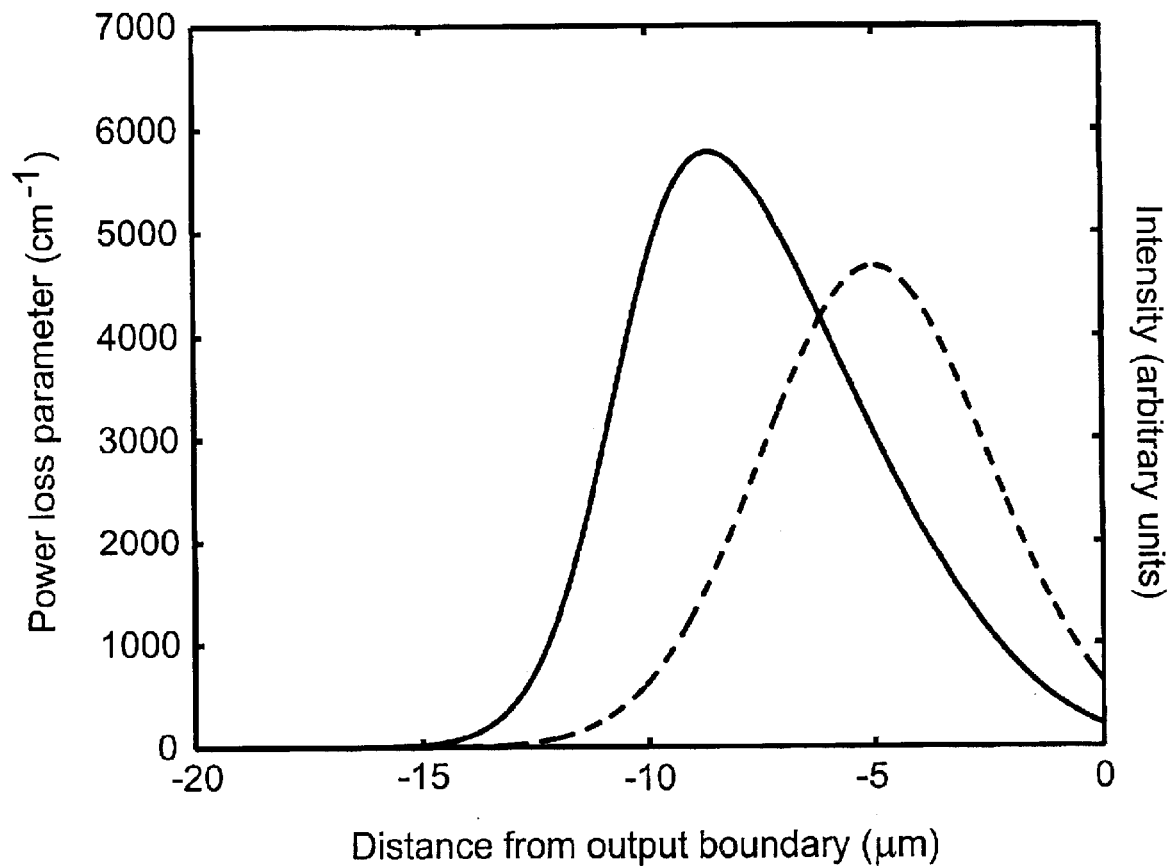
FIG. 12 shows the Gaussian intensity profile (dashed line) and corresponding power loss parameter (solid line) for a preferred embodiment I/O port.

The present I/O ports can be further enhanced so as to further improve coupling efficiency (that is, to further reduce insertion loss). In particular, optical scattering elements can be arranged in such a way as to intentionally vary the power loss parameter within the coupling region. Thus, another preferred embodiment of the present I/O ports is an I/O port of the type shown in FIG. 3(a). That I/O port features a Gaussian-like input beam. An illustrative calculation of the optimal power loss parameter profile, calculated using methods which are well known, is shown in FIG. 12, where the dashed line shows the target Gaussian beam profile, and the solid line shows the corresponding power loss parameter profile required for relatively high coupling efficiency. The power loss parameter, which progressively increases away from the output boundary, is relatively small at or near the output boundary, which occurs at x=0. At or near the output boundary, the power in the I/O port, propagating towards the output waveguide, is at or near its peak and the intensity of the Gaussian beam is relatively low. The intensity of the input beam, which has a Gaussian profile, is relatively higher away from the output boundary, and it is necessary to have the power loss parameter at an appropriate magnitude in this area in order to achieve acceptable in-coupling of the central portion of the beam. Matching the power loss parameter in the area at or near the output boundary is an important factor in effectively controlling insertion loss. The power loss parameter should also be well matched in the area away from the output boundary in order to effectively control insertion loss. Still further from the output boundary, the power loss parameter drops off again as the Gaussian beam intensity returns to a relatively low level. In that area, the value of the power loss parameter is not as critical as in the other regions because both the intensity of the Gaussian beam and the power in the I/O port are at relatively lower values.

Figure 13:
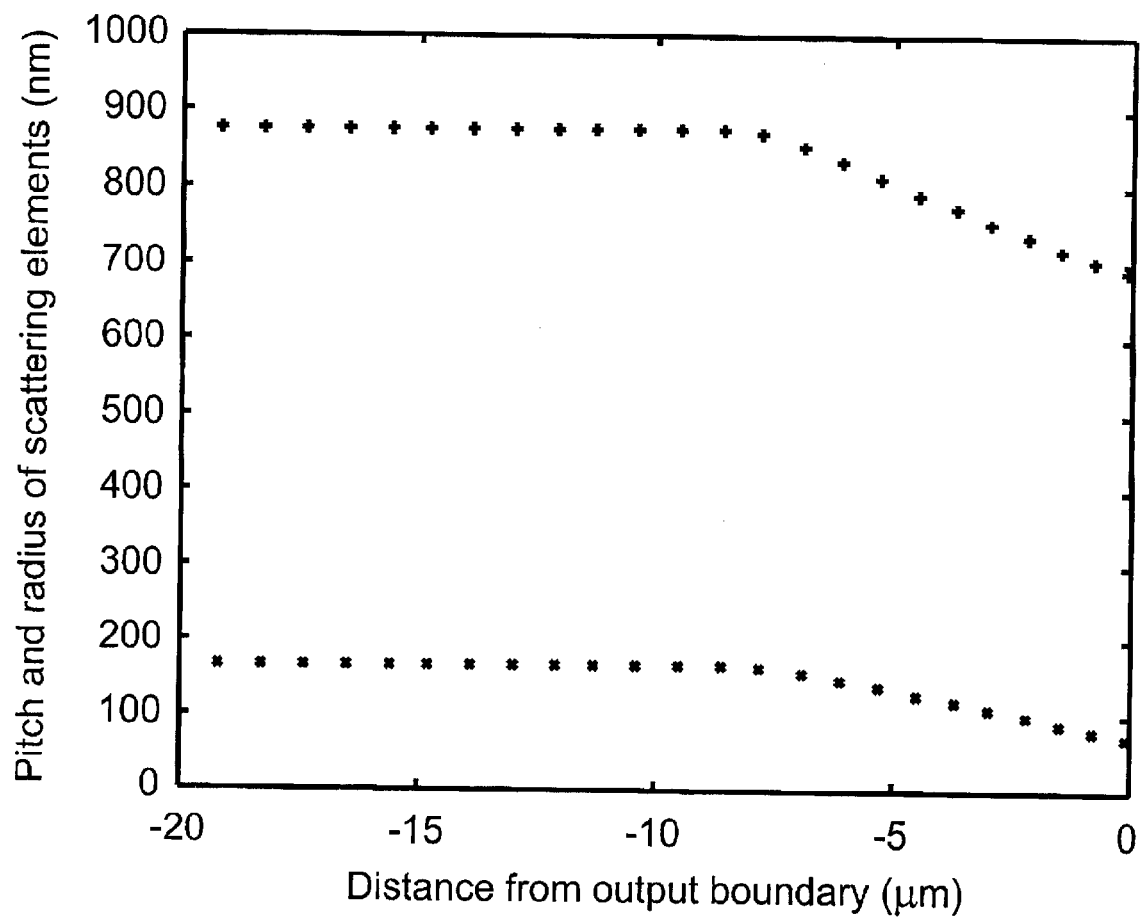
FIG. 13 shows the pitch ("+" symbols) and radius ("×" symbols) as a function of position within the coupling region for a preferred embodiment I/O port.

Once a desired power loss parameter profile, effective index of refraction, operating frequency and coupling angle are determined, the pitch(es) and volume(s) of the optical scattering elements can then be determined. To determine the appropriate parameters for an optical scattering element at a particular position in the coupling region, we model an infinite uniform lattice of identical optical scattering elements using the Green's function technique mentioned earlier. The optical scattering element volume and pitch vary slowly and smoothly across the coupling region, and, as described above, the volume of each optical scattering element becomes relatively smaller as the optical scattering elements approach the output boundary. An iterative design procedure, using such a model, is used to select an appropriate pitch and optical scattering element volume at each position across the coupling region in order to ensure that (a) the power loss parameter profile is substantially the same as the desired profile at all positions across the coupling region and (b) a substantially constant frequency at which maximum coupling occurs for the given incident beam angle occurs at all positions across the coupling region. A preferred embodiment of such an I/O port comprises a layered structure having a first intermediate layer comprising GaAs, which layer has a thickness of approximately 184 nm, on top of a second intermediate layer comprising $Al_xO_y$, and a multi-layer substrate. The multi-layer substrate comprises an upper layer, lower alternating layers and a lowest layer. The upper layer comprises $Al_xO_y$, which layer has a thickness of approximately 850 nm and is located above 10 pairs of the lower alternating layers, which layers alternate between a layer comprising GaAs and a layer comprising AlAs and have respective thicknesses of approximately 116 nm and approximately 133 nm. The lowest substrate layer is a relatively thick GaAs layer. The alternating layers of GaAs and AlAs serve as a reflector underneath the coupling region. In particular, those alternating layers enhance the branching ratio by preventing the flow of light from the coupling region into the substrate. Optical scattering elements are cylindrical holes that extend through the intermediate layer comprising GaAs and through the intermediate layer comprising $Al_xO_y$, and the intermediate layer of $Al_xO_y$ has a thickness of approximately 300 nm. The coupling region, which subsists in the intermediate layers, covers an area of approximately 20 µm by approximately 20 µm. This embodiment of the present I/O ports is designed to effectively operate at a range of frequencies within the C-band. The input light for this embodiment is preferably at an incidence angle θ=approximately +12°. The power loss parameter profile is chosen to match a Gaussian input beam with a mode field diameter of approximately 10 µm, with the center of that beam located approximately 5 µm from the output boundary. In this embodiment of the present I/O ports, the pitch is constant in the y-direction and is approximately 400 nm. The power loss parameter in this preferred embodiment is similar to that shown in FIG. 12, except that that power loss parameter remains constant at a value of approximately 5800 $cm^{-1}$ at distances from the output boundary that are less than approximately −9 µm. The corresponding variation of pitch and the corresponding variation of the radius (for each optical scattering element) along the coupling region are shown in FIG. 13 by the "+" and "x" symbols, respectively. The radius and pitch of each optical scattering element increase, in the direction from the output boundary towards the coupling region, as the distance from the output boundary increases. Such a relationship, which is illustrated in FIG. 13, achieves the necessary power loss parameter variation while maintaining a substantially constant frequency at which maximum coupling occurs for the given incident beam angle. FDTD simulations for this preferred embodiment show the peak coupling efficiency is approximately 86%, the center wavelength is approximately 1550 nm and the FWHM bandwidth is approximately 50 nm.

In another preferred embodiment of the present I/O ports, non-uniformly placed optical scattering elements of non-uniform volume are incorporated into an I/O port of the form shown in FIG. 3(c) to effectively couple a Gaussian-like input beam of any polarization. The lattice is oriented as shown in FIG. 11. The lattice pitch and optical scattering element radii decrease as they approach the output boundary (10), and are selected such that the desired power loss parameter variation (as shown in FIG. 12) can be achieved. Such an arrangement results in more effective coupling relative to prior I/O ports that feature a uniform arrangement of optical scattering elements in the same or a similar layer structure and that couple light into a substantially unpatterned region. The improved coupling and low polarization dependent loss over a range of frequencies within the C-band are due to beam profile matching and reduction of loss at the output boundary.

While examples described above have involved cylindrical or rectilinear (for example, rectangular) optical scattering elements, an increase in coupling efficiency may be obtained with other optical scattering elements such as elliptical holes, hemispherical holes, conical holes or angled optical scattering elements (with angled optical scattering elements being optical scattering elements that are not normal to the x-y plane of the I/O port), optical scattering elements comprising more than one type of underlying (that is, foundational) optical scattering element, optical scattering elements whose underlying optical scattering elements are of differing volumes, and/or optical scattering elements that are located within different layers. Furthermore, optical scattering elements characterized by reduced symmetry (for example, rectangular holes) may be useful in certain applications. The goal of such relatively complex optical scattering elements is to achieve asymmetry in the unit cell in both the vertical direction, to enhance the branching ratio, and in the horizontal (that is, in-plane) direction, to preferentially direct light from the scattering region towards the output waveguide(s).

Figure 14:
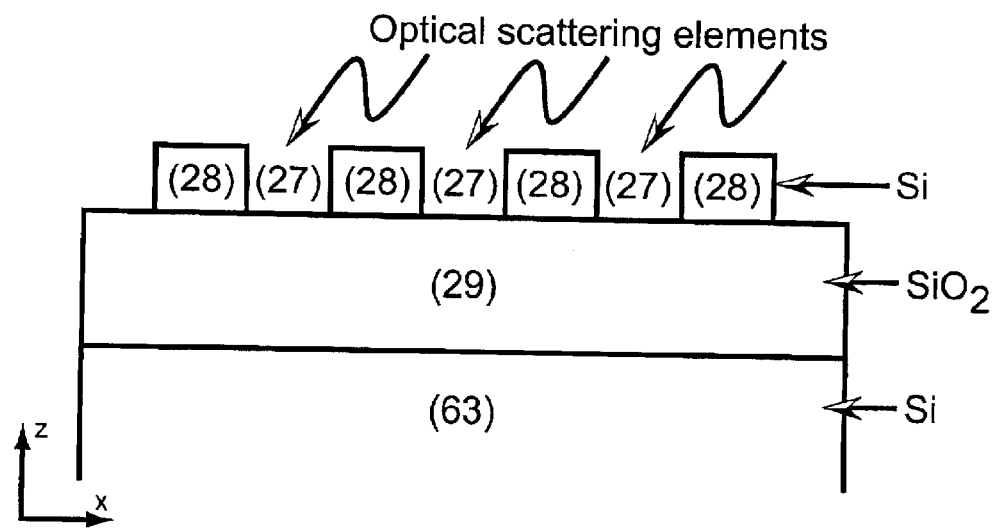
FIG. 14 shows a cross-sectional view of a preferred embodiment I/O port fabricated with silicon-on-insulator (SOI) materials.
Figure 14:
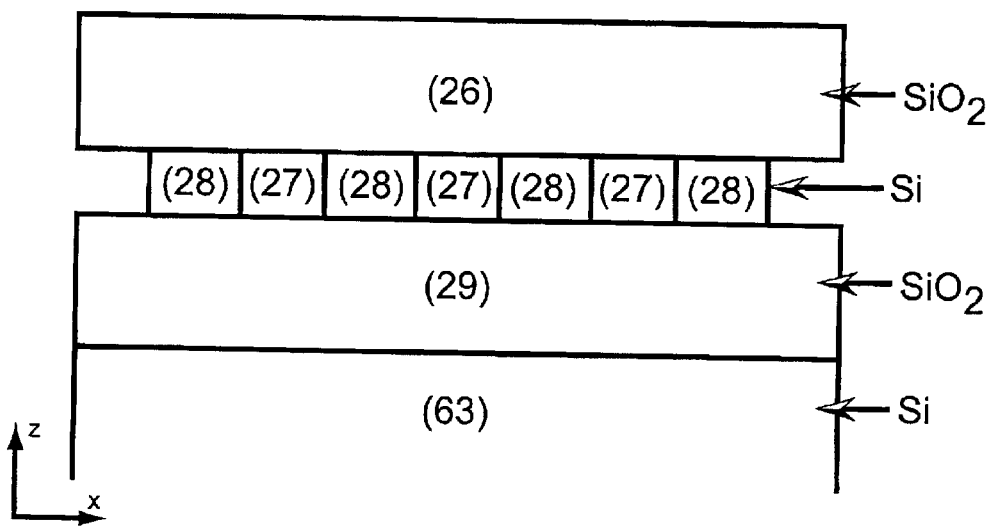

Another preferred embodiment of the present I/O ports is shown, in a schematic, cross-sectional view, in FIG. 14(b). That I/O port features an encapsulating unpatterned superstrate layer (26) (for example, comprising $SiO_2$) and optical scattering elements (27) above unpatterned substrate layers (29, 63). Such an I/O port may be fashioned in a two-step process. First, an intermediate layer (28) (for example, comprising silicon (Si)), as shown in FIG. 14(a), can be appropriately patterned with optical scattering elements. Second, an unpatterned superstrate layer (26), comprising, for example, $SiO_2$, can be attached to the intermediate layer (28) by wafer bonding. This process allows for incorporation of a superstrate layer (that is, an unpatterned superstrate layer (26), as shown in FIG. 14(b)), other than air, into the present I/O ports. The thickness of the superstrate layer (26) can, as stated earlier, be appropriately selected so as to control I/O port characteristics and performance. In addition, the unpatterned superstrate layer (26) (which, in this embodiment, is an $SiO_2$ layer) serves as mechanical protection by encapsulating the optical scattering elements. Such an embodiment may provide certain commercial advantages not related to actual performance of the I/O port. For example, packaging of the above-described embodiment of the present I/O ports may be facilitated insofar as packaging materials may come into contact with the upper surface of the finished device without any concern for damage to the finished device. Further, such an embodiment may prevent particulates and other undesirable by-products of chip dicing and manufacturing from becoming embedded in the patterned optical scattering elements (for example, when the elements are filled with air, vacuum, or a gas). While a preferred embodiment where the encapsulation layer comprises a single $SiO_2$ layer has been described, a multi-layer encapsulation layer comprising, for example, Si and $SiO_2$, may be appropriate for certain applications of the present I/O ports.

Further improvements of the present I/O ports can be realized by appropriate design of the output region. In other words, the spot size of the input optical mode typically found in optical fibers can be adapted to the mode size of the optical signal in high-index-contrast output waveguides. For example, by etching a two-dimensional arrangement of holes into an initially unpatterned layer in which lattice spacing slowly varies transverse to the direction of propagation of light coupled into the waveguide, an achromatic planar waveguide lens output region may be formed. For example, cylindrical holes may be arranged with a constant lattice spacing $a_{x'}$, in the x'-direction, and a spacing between holes in the y' direction that varies parabolically away from the center line, y'=0. By appropriate design, the approximately 10 $\mu$m spot coupled into the waveguide in the coupling region can be reduced in the output region to match the smaller mode profile of the output waveguide. Normally, the output waveguide would be chosen to be identical to other waveguides in the rest of the planar or substantially planar photonic circuit in order to facilitate connection of the output waveguide to the rest of the planar or substantially planar photonic circuit in which the I/O port is used.

The present I/O ports can be used to create polarization-insensitive photonic circuits with polarization-sensitive integrated photonic elements. The difficulty in achieving polarization-insensitive operation of photonic circuits is fundamentally linked to the axial coupling geometry illustrated in FIG. 1. In that geometry, incoming light of an unknown or varying polarization couples to the transverse electric (TE) mode, which has its electric field parallel to the surface of the planar or substantially planar photonic device, to the transverse magnetic (TM) mode, which has its electric field perpendicular to the surface of the planar or substantially planar photonic device, or to both. Achieving polarization-insensitive operation of the planar or substantially planar photonic device requires that the layer structures and device geometries be carefully adjusted to match the TE and TM responses to one another, or requires incorporation of intermediate elements in the photonic circuit (with waveplates being an example of such intermediate elements). The above-described careful adjustments and incorporation of intermediate elements are both difficult to achieve in a general photonic circuit, and the need to implement one or the other imposes restrictions on effective designs of I/O ports and photonic circuits. With the present I/O ports, which are based on off-normal, or normal or near-normal, incidence coupling, incoming light of different polarizations is coupled to two or more separate outgoing beams, each of which has the same polarization in the planar or substantially planar device. For example, the incoming signal may be coupled into two TE-polarized output signals propagating in different directions. Those two output signals can be processed by two substantially identical or identical optical elements, each of which is required to respond only to a single polarization (for example, the TE polarization).

Figure 15:
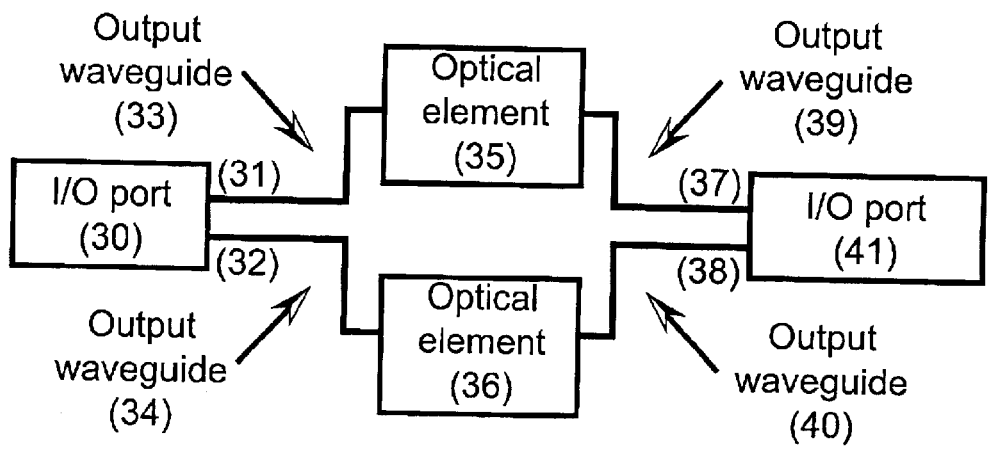
FIG. 15(a) is a schematic diagram showing a photonic circuit in which an input port has two outputs of identical polarization, which outputs are coupled to two substantially identical optical elements (for example, optical filters), the outputs of which are directed to an output port.
FIG. 15(b) is a schematic diagram showing a device where two outputs from an input port are coupled into two potentially different optical elements, a two-input combiner, such as a multimode coupler, and into a single output port.
Figure 15:
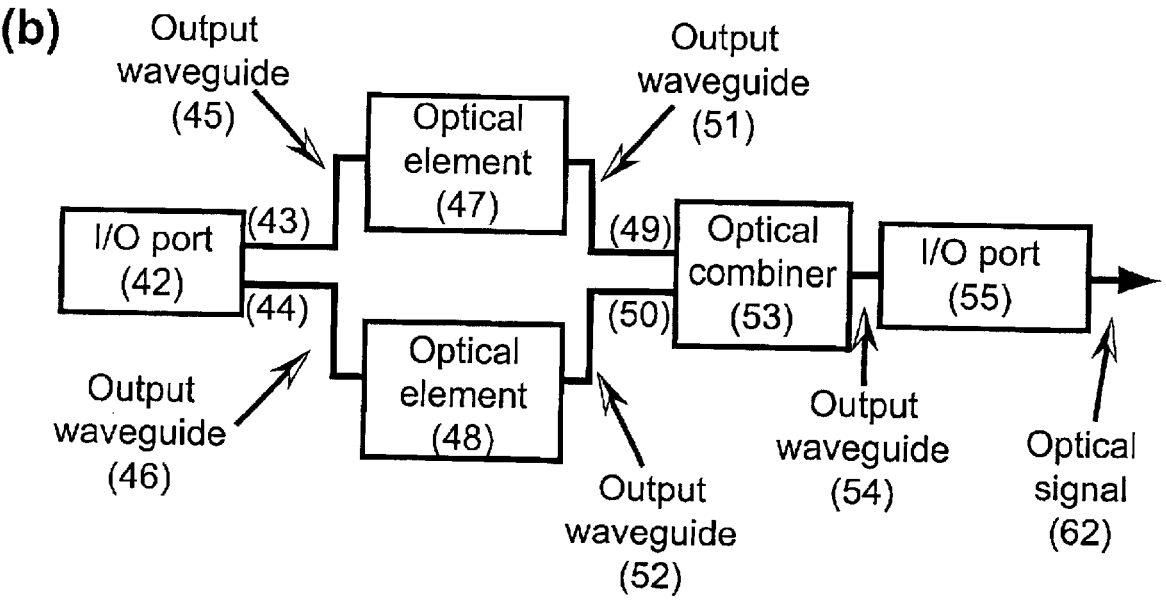

FIG. 15(a) illustrates a photonic circuit comprising a preferred embodiment of the present I/O ports. In that embodiment, an I/O port (30) directs two outputs of light (31, 32) of substantially identical TE polarization to two output waveguides (33, 34), which then couple the two outputs of light (31, 32) into two suitable (and, in this case, substantially identical) optical elements (35, 36), the two outputs of which (37, 38) are directed by two output waveguides (39, 40) to an I/O port (41). In this balanced arrangement, PDL and PMD can be controlled (for example, reduced). Where the two optical elements (35, 36) are effectively matched (that is, in a well-balanced photonic circuit), PDL and PMD may be effectively eliminated.

FIG. 15(b) illustrates another photonic circuit comprising another preferred embodiment of the present I/O ports. In that embodiment, an I/O port (42), directs two outputs of light (43, 44) to two output waveguides (45, 46), which then couple the two outputs of light (43, 44) into two optical elements (47, 48), the outputs (49, 50) of which are directed by two output waveguides (51, 52) to a two-input optical combiner (53), such as, for example, a multi-mode interference (MMI) combiner which is well known in the art, and then into a single output waveguide (54), which connects to an I/O port (55). By incorporating suitable optical elements (for example, variable optical delay elements), the two polarizations may be combined in-phase to yield maximum power in the output waveguide (54), thereby resulting in an optical signal (62) emerging from the output port (55) with a known state of polarization at or just outside of the output port.

In addition to the specific materials described above (for example, GaAs, $Al_xO_y$, Si, and $SiO_2$), other materials may be suitable materials for the superstrate layer(s), intermediate layer(s) and/or substrate layer(s) of the present I/O ports, depending, for example, on the particular application(s) at issue. For example, SiN (silicon nitride) may be a suitable material for the present I/O ports, and so too may be InP (that is, indium phosphide), an alloy comprising InGaAs (that is, indium gallium arsenide) and an alloy comprising InGaAsP (that is, indium gallium arsenide phosphide). $Al_xO_y$ may be prepared by oxidation of aluminum-containing compounds such as AlAs (that is, aluminum arsenide), an alloy comprising AlGaAs, an alloy comprising InAlGaAs (that is, indium aluminum gallium arsenide) or an alloy comprising InAlAs.

Many additional modifications are variations of the present I/O ports are possible in light of the above teachings. Thus, it is to be understood that, within the scope of the appended claims, the I/O ports may be practiced otherwise than as described hereinabove.

What is claimed is:

1. A photonic input/output port, comprising:
   (a) a layered structure comprising an unpatterned superstrate having at least one layer, an unpatterned substrate having at least one layer and at least one intermediate layer sandwiched between the unpatterned superstrate and the unpatterned substrate,
   (b) a coupling region that is within the at least one intermediate layer and that comprises an arrangement of at least one optical scattering element, and
   (c) at least one output waveguide,
   wherein the at least one optical scattering element has an index contrast that is greater than or equal to approximately 1.

2. The photonic input/output port of claim 1 further comprising at least one output region.

3. The photonic input/output port of claim 1 further comprising at least one in-plane reflector region.

4. The photonic input/output port of claim 1 wherein the unpatterned substrate serves as a reflector.

5. The photonic input/output port of claim 1, wherein the at least one optical scattering element has a geometry from the group consisting of: cylindrical hole, elliptical hole, hemispherical hole, rectilinear trench, conical hole, angled cylindrical hole, angled hemispherical hole, angled elliptical hole, angled rectilinear trench and angled conical hole.

6. The photonic input/output port of claim 1, wherein the arrangement of at least one optical scattering element is uniform.

7. The photonic input/output port of claim 1, wherein the at least one layer of the unpatterned superstrate comprises a material from the group consisting of: air, GaAs, Si, $SiO_2$, SiN, InP, an alloy comprising InGaAs, an alloy comprising InGaAsP, an alloy comprising AlGaAs, an alloy comprising InAlGaAs, an alloy comprising InAlAs and an aluminum oxide.

8. The photonic input/output port of claim 1, wherein the at least one layer of the unpatterned substrate comprises a material from the group consisting of: GaAs, Si, $SiO_2$, SiN, InP, an alloy comprising InGaAs, an alloy comprising InGaAsP, an alloy comprising AlGaAs, an alloy comprising InAlGaAs, an alloy comprising InAlAs and an aluminum oxide.

9. The photonic input/output port of claim 1, wherein the at least one intermediate layer comprises a material from the group consisting of: GaAs, Si, $SiO_2$, SiN, InP, an alloy comprising InGaAs, an alloy comprising InGaAsP, an alloy comprising AlGaAs, an alloy comprising InAlGaAs, an alloy comprising InAlAs and an aluminum oxide.

10. The photonic input/output port of claim 1, wherein the at least one unpatterned substrate layer is located above at least one pair of additional substrate layers, which alternate between a layer comprising GaAs and a layer comprising AlAs.

11. The photonic input/output port of claim 1, wherein the at least one unpatterned substrate layer is located above at least one pair of additional substrate layers, which alternate between a layer comprising GaAs and a layer comprising an alloy comprising AlGaAs.

12. The photonic input/output port of claim 1, wherein the at least one unpatterned substrate layer is located above at least one pair of additional substrate layers, which alternate between a layer comprising Si and a layer comprising $SiO_2$.

13. The photonic input/output port of claim 2, wherein the at least one output waveguide is a ridge waveguide.

14. The photonic input/output port of claim 1, further comprising an output boundary, wherein the arrangement of at least one optical scattering element comprises two or more optical scattering elements and the volumes of the scattering materials gradually decrease as they approach the area near or at the output boundary.

15. Use of the photonic input/output port of claim 1 in a photonic circuit, with input light entering the photonic circuit at off-normal incidence from the top plane of the photonic circuit.

16. Use of the photonic input/output port of claim 1 in a photonic circuit, with input light entering the photonic circuit at an incidence of approximately +/−12° from the top plane of the photonic circuit.

17. Use of the photonic input/output port of claim 1 in a photonic circuit, with input light entering the photonic circuit at an incidence of approximately +/−8° from the top plane of the photonic circuit.

18. A balanced photonic circuit, comprising:
   (a) a first photonic input/output port and a second photonic input/output port, each input/output port comprising:
      i. a layered structure comprising an unpatterned superstrate having at least one layer, an unpatterned substrate having at least one layer and at least one intermediate layer sandwiched between the unpatterned superstrate and the unpatterned substrate, and
      ii. a coupling region that is within the at least one intermediate layer and that comprises an arrangement of at least one optical scattering element,
   wherein the at least one optical scattering element has an index contrast that is greater than or equal to approximately 1,
   (b) a first output waveguide,
   (c) a second output waveguide,
   (d) a third output waveguide,
   (e) a fourth output waveguide, (f) a first optical element, and (g) a second optical element, wherein the first output waveguide connects the first input/output port to the first optical element, the second output waveguide connects the first input/output port to the second optical element, the third output waveguide connects the first optical element to the second input/output port, the fourth output waveguide connects the second optical element to the second input/output port and the first and second optical elements are at least substantially identical.

19. An unbalanced photonic circuit, comprising:

(a) a first photonic input/output port, comprising:
  i. a layered structure comprising an unpatterned superstrate having at least one layer, an unpatterned substrate having at least one layer and at least one intermediate layer sandwiched between the unpatterned superstrate and the unpatterned substrate, and
  ii. a coupling region that is within the at least one intermediate layer and that comprises an arrangement of at least one optical scattering element, wherein the at least one optical scattering element has an index contrast that is greater than or equal to approximately 1, (b) a second photonic input/output port, comprising:
  i. a layered structure comprising an unpatterned superstrate having at least one layer, an unpatterned substrate having at least one layer and at least one intermediate layer sandwiched between the unpatterned superstrate and the unpatterned substrate, and
  ii. a coupling region that is within the at least one intermediate layer and that comprises an arrangement of at least one optical scattering element, wherein the at least one optical scattering element has an index contrast that is greater than or equal to approximately 1, (c) a first output waveguide, (d) a second output waveguide, (e) a third output waveguide, (f) a fourth output waveguide, (g) a fifth output waveguide, (h) a first optical element, (i) a second optical element, and (j) an optical combiner, wherein the first output waveguide connects the first input/output port to the first optical element, the second output waveguide connects the first input/output port to the second optical element, the third output waveguide connects the first optical element to the optical combiner, the fourth output waveguide connects the second optical element to the optical combiner and the fifth output waveguide connects the optical combiner to the second input/output port.

* * * * *